(12) United States Patent
Bell

(10) Patent No.: US 7,732,007 B2
(45) Date of Patent: *Jun. 8, 2010

(54) METHOD OF MAKING A POLARIZER PLATE

(75) Inventor: Brent C. Bell, Fairport, NY (US)

(73) Assignee: Eastman Kodak Company, Rochester, NY (US)

( * ) Notice: Subject to any disclaimer, the term of this patent is extended or adjusted under 35 U.S.C. 154(b) by 398 days.

This patent is subject to a terminal disclaimer.

(21) Appl. No.: 11/305,928

(22) Filed: Dec. 19, 2005

(65) Prior Publication Data

US 2007/0141243 A1 Jun. 21, 2007

(51) Int. Cl.
*G02B 1/10* (2006.01)
(52) U.S. Cl. .................. 427/163.1; 427/168; 427/209; 427/407.1; 427/469; 427/470; 427/471
(58) Field of Classification Search ............. 427/163.1, 427/209, 407.1; 349/96
See application file for complete search history.

(56) References Cited

U.S. PATENT DOCUMENTS

| | | | |
|---|---|---|---|
| 2,362,580 A | 11/1944 | Nadeau et al. | |
| 2,761,791 A | 9/1956 | Russell | |
| 3,508,947 A | 4/1970 | Hughes | |
| 4,070,189 A | 1/1978 | Kelley et al. | |
| 4,203,769 A | 5/1980 | Guestaux | |
| 4,275,103 A | 6/1981 | Tsubusaki et al. | |
| 4,394,441 A | 7/1983 | Kawaguchi et al. | |
| 4,416,963 A | 11/1983 | Takimoto et al. | |
| 4,418,141 A | 11/1983 | Kawaguchi et al. | |
| 4,431,764 A | 2/1984 | Yoshizumi | |
| 4,495,276 A | 1/1985 | Takimoto et al. | |
| 4,571,361 A | 2/1986 | Kawaguchi et al. | |
| 4,619,956 A | 10/1986 | Susi | |
| 4,701,028 A | 10/1987 | Clerc et al. | |
| 4,822,640 A * | 4/1989 | Tuhkanen et al. | 427/211 |
| 4,845,369 A | 7/1989 | Arakawa et al. | |
| 4,999,276 A | 3/1991 | Kuwabara et al. | |
| 5,122,445 A | 6/1992 | Ishigaki | |
| 5,166,666 A | 11/1992 | Tanaka | |

(Continued)

FOREIGN PATENT DOCUMENTS

DE 41 23 557 7/1991

(Continued)

OTHER PUBLICATIONS

Mohri et al., "Highly Durable Dyed Polarizer for Use in LCD Projection", Proceedings of the SPIE-Int. Soc. Opt. Eng., vol. 2407, pp. 62-72, (1995).

(Continued)

*Primary Examiner*—Nadine Norton
*Assistant Examiner*—Maki Angadi
(74) *Attorney, Agent, or Firm*—Nelson Adrian Blish

(57) ABSTRACT

This invention relates to polarizing plates and their manufacturing process. More particularly, this invention provides a method of making a polarizing plate comprising, providing a polarizing film, coating at least one optical film solution to both sides of the polarizing film simultaneously or near simultaneously, and drying the optical film coating solution to form an optical film on each side of the polarizing film.

22 Claims, 6 Drawing Sheets

U.S. PATENT DOCUMENTS

| | | | |
|---|---|---|---|
| 5,186,754 A * | 2/1993 | Umemura et al. | 118/411 |
| 5,244,713 A * | 9/1993 | Nakamura et al. | 428/156 |
| 5,310,509 A | 5/1994 | Okada et al. | |
| 5,340,504 A | 8/1994 | Claussen | |
| 5,368,995 A | 11/1994 | Christian et al. | |
| 5,370,981 A | 12/1994 | Krafft et al. | |
| 5,410,422 A | 4/1995 | Bos | |
| 5,446,135 A | 8/1995 | Misawa et al. | |
| 5,583,679 A | 12/1996 | Ito et al. | |
| 5,619,352 A | 4/1997 | Koch et al. | |
| 5,667,719 A | 9/1997 | Mortazavi et al. | |
| 5,719,016 A | 2/1998 | Christian et al. | |
| 5,731,119 A | 3/1998 | Eichorst et al. | |
| 5,776,251 A | 7/1998 | Irie et al. | |
| 5,853,801 A | 12/1998 | Suga et al. | |
| 5,919,555 A | 7/1999 | Yasuda et al. | |
| 5,978,055 A | 11/1999 | Van De Witte et al. | |
| 6,160,597 A | 12/2000 | Schadt et al. | |
| 6,210,858 B1 | 4/2001 | Yasuda et al. | |
| 6,590,707 B1 * | 7/2003 | Weber | 359/498 |
| 6,730,374 B2 * | 5/2004 | Gamble et al. | 428/1.54 |
| 7,163,738 B2 * | 1/2007 | Bermel | 428/339 |
| 7,250,200 B2 * | 7/2007 | Elman | 428/1.3 |
| 2002/0145801 A1 * | 10/2002 | Tsuchimoto et al. | 359/485 |
| 2002/0162483 A1 | 11/2002 | Shimizu et al. | |
| 2003/0001987 A1 * | 1/2003 | Trapani et al. | 349/96 |
| 2003/0002154 A1 | 1/2003 | Trapani et al. | |
| 2003/0080326 A1 | 5/2003 | Schunk et al. | |
| 2004/0021814 A1 | 2/2004 | Elman et al. | |
| 2004/0217647 A1 | 11/2004 | Einig et al. | |
| 2005/0057706 A1 | 3/2005 | Seki et al. | |
| 2005/0084622 A1 | 4/2005 | Houghtaling et al. | |
| 2005/0106377 A1 | 5/2005 | Koestner et al. | |
| 2005/0196552 A1 | 9/2005 | Lehmann et al. | |
| 2005/0286001 A1 | 12/2005 | Elman et al. | |
| 2006/0062933 A1 | 3/2006 | Schunk et al. | |
| 2006/0153998 A1 | 7/2006 | Greener et al. | |

FOREIGN PATENT DOCUMENTS

| | | |
|---|---|---|
| EP | 0549342 A2 | 6/1993 |
| JP | 05-273788 | 10/1993 |
| JP | 06-094915 | 4/1994 |
| JP | 06094915 A | 4/1994 |
| JP | 11-95208 | 9/1999 |
| JP | 2000-199819 | 7/2000 |
| JP | 2000-352619 | 12/2000 |
| JP | 2002-296417 | 10/2002 |
| JP | 63-243166 | 6/2008 |

OTHER PUBLICATIONS

H.A. MacLEOD, "Thin Film Optical Filters", Adam Hilger, Ltd., Bristol 1985 (To Follow).

James D. Rancourt, "Optical Thin Films User's Handbook", Macmillan Publishing Company, 1987 (To Follow).

* cited by examiner

METHOD OF MAKING A POLARIZER PLATE

FIELD OF THE INVENTION

This invention relates to polarizing plates and their manufacturing process. More particularly, this invention provides a method of making a polarizing plate comprising, providing a polarizing film, coating at least one optical film solution to both sides of the polarizing film simultaneously or near simultaneously, and drying the optical film coating solution to form an optical film on each side of the polarizing film.

BACKGROUND OF THE INVENTION

Optical films comprising polymeric resin films are used in a variety of electronic display applications. In particular, resin films are used as protective cover sheets for light polarizers in Liquid Crystal Displays (LCD).

LCDs may contain a number of optical elements that may be formed from resin films. The structure of reflective LCD's may include a liquid crystal cell, one or more polarizer plates, and one or more light management films. Liquid crystal cells are formed by dispersing liquid crystals such as twisted nematic (TN) or super twisted nematic (STN) materials between two electrode substrates.

Polarizer plates (also commonly called "polarizers") are widely used in displays to control incoming and outgoing light. For example, in LCDs, a liquid crystal cell is typically situated between a pair of polarizer plates. Incident light polarized by the first polarizer plate passes through a liquid crystal cell and is affected by the molecular orientation of the liquid crystal, which can be altered by the application of a voltage across the cell. The altered light goes into the second polarizer plate. By employing this principle, the transmission of light from an external source, including ambient light, can be controlled. LCD's are quickly taking over from traditional CRTs in computer monitors and TVs because of their lower energy consumption and thinness.

Polarizer plates are typically a multi-layer element comprised of a polarizing film sandwiched between two protective cover sheets. Polarizing films are normally prepared from a transparent and highly uniform amorphous resin film that is subsequently stretched to orient the polymer molecules and stained with iodine or organic dichroic dyes to produce a dichroic film. An example of a suitable resin for the formation of polarizer films is fully hydrolyzed polyvinyl alcohol (PVA). Because the stretched PVA films used to form polarizers are very fragile and dimensionally unstable, protective cover sheets are normally laminated to both sides of the PVA film to offer both support and abrasion resistance. Protective cover sheets of polarizer plates are required to have high uniformity, good dimensional and chemical stability, and high transparency. After formation of the polarizing film, a protective cover sheet is laminated to each side of the polarizing film using glue or adhesive.

Originally, protective cover sheets were formed from glass. Today, protective cover sheets are generally multi-layer polymeric films that comprise a low birefringence polymer film and one or more other optical films that serve specific functions such as an antiglare layer, hardcoat layer, low reflection layer, antireflection layer, and compensation layer, for example. Generally, these antiglare, hardcoat, low reflection, antireflection, and compensation layers are applied in a process step that is separate from the manufacture of the low birefringence polymer film.

Although many polymers have been suggested for use as the low birefringence polymer film in protective cover sheets, cellulosics, acrylics, cyclic olefin polymers, polycarbonates, and sulfones are most commonly used. Polymers of the acetyl cellulose type are commercially available in a variety of molecular weights as well as the degree of acyl substitution of the hydroxyl groups on the cellulose backbone. Of these, the fully substituted polymer, triacetyl cellulose (TAC) is commonly used to manufacture low birefringence polymer films for use in protective cover sheets for polarizer plates.

Prior to lamination to the PVA polarizing film the cover sheet normally requires a surface treatment to insure good adhesion to the PVA film. When TAC is used in the protective cover film of a polarizer plate, the TAC film is subjected to treatment in an alkali bath to saponify the TAC surface to provide suitable adhesion to the PVA film. The alkali treatment uses an aqueous solution containing a hydroxide of an alkali metal, such as sodium hydroxide or potassium hydroxide. After alkali treatment, the cellulose acetate film is typically washed with a weak acid solution followed by rinsing with water and drying. This saponification process is both messy and time consuming. U.S. Pat. No. 2,362,580 describes a laminar structure wherein two cellulose ester films each having a surface layer containing cellulose nitrate and a modified PVA is adhered to both sides of a PVA film. JP 06094915A discloses a protective film for polarizer plates wherein the protective film has a hydrophilic layer which provides adhesion to PVA film. U.S. Patent Application 2003/0002154 describes an optical stack that includes an intrinsic polarizer. Optically functional coating are disposed on one or both of the surfaces of the intrinsic polarizer.

Some LCD devices may contain a protective cover sheet that also serves as a compensation film to improve the viewing angle of an image. Compensation films (i.e. retardation films or phase difference films) are normally prepared from amorphous films that have a controlled level of birefringence either by uniaxial stretching or by coating with discotic dyes.

There is a need for a new process to manufacture polarizer plates that eliminates the need for the saponification and lamination processes normally employed. There is also a need to provide a process that eliminates the necessity to apply additional layers such as an antiglare layer, hard coat layer, antireflection layer, compensation layer, etc. onto the low birefringence polymer film in a separate manufacturing operation. Additionally, there is a need to provide thinner polarizer plates for today's thin and light weight display devices, however, thin optical films are difficult to handle without wrinkling during a conventional lamination process. Finally, optical films such as those used as conventional protective cover sheets for polarizer plates are susceptible to scratch and abrasion, as well as the accumulation of dirt and dust, during their manufacture, shipping/handling, and lamination to a polarizing film.

SUMMARY OF THE INVENTION

The present invention provides a method of making a polarizing plate comprising, providing a polarizing film, coating at least one optical film solution to both sides of the polarizing film simultaneously or near simultaneously, and drying the optical film coating solution(s) to form an optical film or optical film stack on each side of the polarizing film. In one embodiment more than one optical film is coated on each side of the polarizing film. In this embodiment the number of optical films coated on each side of the polarizing film may be the same or different. In another embodiment more than one optical film is coated on one side of the polarizing film and one optical film is coated on the other side of the polarizing film. The composition or type of the optical film or films coated on each side of the polarizing film may be the same or different. Additionally a second optical film may be coated on one or both sides of the polarizing film after the at least one optical film is dry. In yet another embodiment a tie layer is coated on one or both sides of the polarizing film prior to coating the other optical film layers.

The present invention eliminates the need for the saponification and lamination processes normally employed in the fabrication of polarizer plates. Since the lamination process is avoided, thinner optical films may be applied onto the polarizing film without the risk of wrinkling that would occur for such thin films during a conventional lamination process. Ultra thin polarizer plates may even be formed by coating optical films such as an antiglare layer, hard coat layer, antireflection layer, or compensation layer, directly onto the polarizing film to form the polarizer plate without the need for a low birefringence polymer film. Additionally, direct application of the optical film coatings onto the polarizing film avoids the potential film damage and dirt accumulation associated with the normal cover sheet manufacture, shipping and handling. Furthermore, coating directly onto a polarizing film prevents the coating from shrinking while drying. The primary advantage of simultaneous coating is that polarizing films generally require a rigid, protective sheet on each side, therefore coating, and especially drying, the two sides simultaneously reduces curl that might otherwise occur if one side is coated and dried first. Also, since the two sides are dried at the same time only one dryer is needed thus reducing equipment costs for the coating machine.

DETAILED DESCRIPTION OF THE INVENTION

Figure 1:
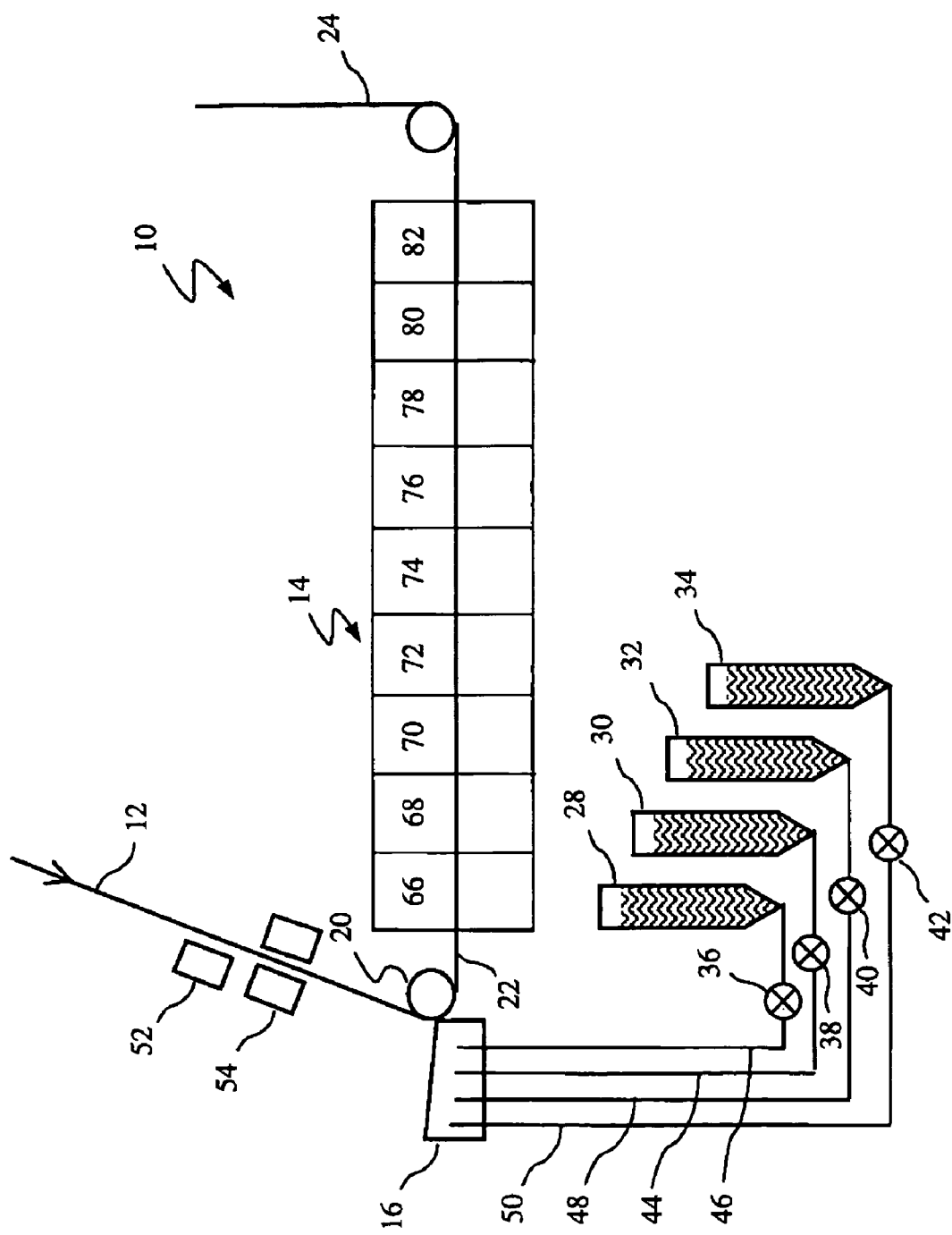
FIG. 1 is a schematic of an exemplary coating and drying apparatus that can be used in the practice of the method of the present invention.

The following definitions apply to the description herein:

In-plane phase retardation, $R_{in}$, of a layer is a quantity defined by $(nx-ny)d$, where nx and ny are indices of refraction in the direction of x and y. x is taken as a direction of maximum index of refraction in the x-y plane and the y direction is perpendicular to it. The x-y plane is parallel to the surface plane of the layer. d is a thickness of the layer in the z-direction. The quantity (nx−ny) is referred to as in-plane birefringence, $\Delta n_{in}$. The value of $\Delta n_{in}$ is given at a wavelength $\lambda$=550 nm.

Out of-plane phase retardation, $R_{th}$, of a layer is a quantity defined by $[nz-(nx+ny)/2]d$. nz is the index of refraction in the z-direction. The quantity $[nz-(nx+ny)/2]$ is referred to as out-of-plane birefringence, $\Delta n_{th}$. If $nz>(nx+ny)/2$, $\Delta n_{th}$ is positive (positive birefringence), thus the corresponding $R_{th}$ is also positive. If $nz<(nx+ny)/2$, $\Delta n_{th}$ is negative (negative birefringence) and $R_{th}$ is also negative. The value of $\Delta n_{th}$ is given at $\lambda$=550 nm.

Intrinsic Birefringence $\Delta n_{int}$ of a polymer refers to the quantity defined by (ne−no), where ne, and no are the extraordinary and the ordinary index of the polymer, respectively. The actual birefringence (in-plane $\Delta n_{in}$ or out-of-plane $\Delta n_{th}$) of a polymer layer depends on the process of forming it, thus the parameter $\Delta n_{int}$.

Amorphous means a lack of long-range order. Thus an amorphous polymer does not show long-range order as measured by techniques such as X-ray diffraction.

Transmittance is a quantity to measure the optical transmissivity. It is given by the percentile ratio of out coming light intensity $I_{out}$ to input light intensity $I_{in}$ as $I_{out}/I_{in} \times 100$.

Optic Axis refers to the direction in which propagating light does not see birefringence.

Uniaxial means that two of the three indices of refraction, nx, ny, and nz, are essentially the same.

Biaxial means that the three indices of refraction, nx, ny, and nz, are all different.

Optical films are single or multi-layer films that include, for example, one or more low birefringence polymer films, antiglare layers, hard coat layers, low reflection layers, antireflection layers, compensations layers, barrier layers, antistatic layers, and tie layers. For the purposes of the current invention each of the above described layers is considered to be a separate optical film. More than one optical film is an optical film stack.

Polarizing film can be prepared on commercial scale processing equipment designed for the production of display grade polarizers. As described, for example, in U.S. 20020162483A1 Section 0224, polyvinyl alcohol (PVA) film in excess of 98% degree of hydrolysis is swollen in water and uniaxially stretched. The resulting film is subsequently immersed in an aqueous solution of iodine and potassium iodide to provide the well-known complex with PVA. The polarizing film is then further immersed in an aqueous solution of potassium iodide and boric acid, washed with water, and dried. This type of polarizing film is typically referred to as an H-Type polarizing film.

It is common practice to produce a polarizing film by stretching a film of polyvinyl alcohol (PVA) and then causing the poly-iodide ($I^-$, $I_3^-$, and $I_5^-$) to be absorbed as a polarizing element in the resulting oriented film. Those polarizers making use of iodine as a polarizing element have good initial performance but generally have poor resistance to water or heat. Under conditions of high temperature and high humidity these polarizers may display a problem in durability. Thus, it is well known in the art to use dichroic organic dyes as a replacement for iodine in the polarizers. Many examples of dichroic organic dyes for polarizing films may be found in the patent literature, for example: U.S. Pat. No. 5,310,509, U.S. Pat. No. 5,340,504, U.S. Pat. No. 5,446,135, JP 2002296417, JP 2000329936, JP 05273788, JP 63243166, EP 549342, U.S. Pat. No. 5,667,719, and the journal literature such as Proceedings of the SPIE-Int. Soc. Opt. Eng. Vol. 2407 pp. 62-72, "Highly Durable Dyed Polarizer for Use in LCD Projections." Polarizing films making use of dichroic organic dye as a polarizing element have better durability against water and heat compared with polarizing films using iodine. It is common practice to use water soluble azo dyes for the manufacture of polarizing films. Combinations of two or more dyes make it possible to produce polarizing films dyed in various hues. It is common to use multiple dyes with a high degree of dichroism to provide a neutral hue to the polarizing film.

Examples of such dichroic organic dyes (Colour Index Generic Name) include the following but are not limited thereto: C.I. Direct Yellow 12, C.I. Direct Blue 202, C.I. Direct Red 31, C.I. Direct Yellow 44, C.I. Direct Yellow 28, C.I. Direct Orange 107, C.I. Direct Red 79, C.I. Direct Blue 71, C.I. Direct Blue 78, C.I. Direct Red 2, C.I. Direct Red 81, C.I. Direct Violet 51, C.I. Direct Orange 26, C.I. Direct Red 247, C.I. Direct Blue 168, C.I. Direct Green 85, C.I. Direct Brown 223, C.I. Direct Brown 106, C.I. Direct Yellow 142, C.I. Direct Blue 1, C.I. Direct Violet 9, C.I. Direct Red 81, Chemical Abstracts Registry Number 6300-50-1, Chemical Abstracts Registry Number 134476-95-2, Chemical Abstracts Registry Number 169454-83-5, and C.I. Direct Blue 98.

There are two main embodiments of the current invention. They are being described together given the intermingled nature of the embodiments. The first is a simultaneous coating method for a polarizing film wherein both sides of the polarizing film are coated simultaneously or near simultaneously. In the simultaneous coating method, each side of the polarizing film may be coated using a single layer coating method or a multi-layer coating method and the number of layers coated may be the same or different. It is also possible, for example, that one or more optical layers may be coated simultaneously on both sides of the polarizer and then that another optical film may be coated on either one or both sides of the polarizer either sequentially or simultaneously. The second embodiment is a multi-layer coating method for a polarizing film. In the multi-layer coating method either one or both sides of the polarizing film may be coated using a multi-layer coating method. Furthermore, both sides of the polarizer may be multi-layer coated simultaneously.

Turning now to FIG. 1 there is shown a schematic of an exemplary and well-known coating and drying apparatus 10 suitable for applying and drying optical film coating solutions onto a polarizing film in accordance with the present invention where suitable. Such an apparatus is particularly useful for sequential and multi-layer coating on one side of a polarizing film. The coating and drying apparatus 10 is typically used to apply very thin films to a moving substrate 12, in this case a polarizing film, and to subsequently remove solvent in a dryer 14. A single coating apparatus 16 is illustrated such that apparatus 10 has only one coating application point and only one dryer 14, however, one or two (even as many as six) additional coating application points with corresponding drying sections are known in the fabrication of composite thin films. The process of sequential application and drying is known in the art as a tandem coating operation. In one embodiment of the present invention, a sequential or tandem coating operation may be employed to prepare a polarizer plate whereby a coating and drying apparatus as illustrated in FIG. 1 may be used to apply a first optical film onto the polarizing film and then a second coating and drying apparatus as illustrated in FIG. 1 may be used to apply a optical film to the other side of the polarizing film.

The polarizing film 12 to be coated in coating and drying apparatus 10 may be provided though a continuous sequential process with the formation of the polarizing film (the polarizing film formation process is described hereinabove and also in U.S. 20020162483A1 Section 0224) or the polarizing film 12 may be supplied from a stock roll of previously prepared polarizing film.

As shown, coating and drying apparatus 10 includes a back-up roller 20 where the coating solution is applied by coating apparatus 16 onto moving polarizing film 12. The coated polarizing film 22 then proceeds through the dryer 14. Dryer 14 will typically use air convection to remove solvent from the coated film. In addition to air convection, dryer 14 may utilize any other means of supplying energy to the coating in order to accelerate the drying rate. Examples of additional energy sources are infra-red or microwave heating elements. An exemplary dryer 14 used in the practice of the method of the present invention includes a first drying section 66 followed by eight additional drying sections 68-82 capable of independent control of temperature and air flow. Although dryer 14 is shown as having nine independent drying sections, drying ovens with fewer compartments are well known and may be used to practice the method of the present invention. In a preferred embodiment of the present invention the dryer 14 has at least two independent drying zones or sections.

Preferably, each of drying sections 68-82 each has independent temperature and airflow controls. In each section, temperature may be adjusted between 5° C. and 150° C. In addition, in each section the airflow characteristics may be altered through the selection of air baffle geometry and the air volumetric flow rate through the baffles. To minimize drying defects from case hardening or skinning-over of the wet layers, optimum drying rates are needed in the early sections of dryer 14 and can be achieved through changes in the air temperature and airflow characteristics. There are a number of artifacts created when temperatures in the early drying zones are inappropriate. For example, fogging or blush of cellulose acetate films is observed when the temperature in zones 66, 68 and 70 are set below 25° C. This blush defect is particularly problematic when high vapor pressures solvents (methylene chloride and acetone) are used in the coating fluids. Aggressively high temperatures above 95° C. or aggressively high air impingement velocities in the early drying sections 66, 68, and 70 are associated with artifacts such as case hardening, mottle, reticulation patterns and blistering of the cover sheet. In preferred embodiment of the present invention, the first drying section 66 is operated at a temperature of at least about 25° C. but less than 95° C. with no direct air impingement on the wet coating of the coated web 22. In another preferred embodiment of the method of the present invention, drying sections 68 and 70 are also operated at a temperature of at least about 25° C. but less than 95° C. It is preferred that initial drying sections 66, 68 be operated at temperatures between about 30° C. and about 60° C. It is most preferred that initial drying sections 66, 68 be operated at temperatures between about 30° C. and about 50° C. The actual drying temperature in drying sections 66, 68 and 70 may optimize empirically within these ranges by those skilled in the art.

As an additional means to prevent blush and fogging defects of cellulose acetate films it is necessary to control the air humidity in drying sections 66-70. In a preferred embodiment of the present invention, the humidity of the air used in drying sections 66-70 is maintained below a dew point temperature of 15° C. It is preferred that the dew point temperature of the air used in drying sections 66-70 be below 10° C. It is most preferred that the dew point temperature of the air used in drying sections 66-70 be below 0° C.

As depicted, an exemplary four-layer coating is applied to moving film 12. Coating liquid for each layer is held in respective coating supply vessel 28, 30, 32, 34. The coating liquid is delivered by pumps 36, 38, 40, 42 from the coating supply vessels to the coating apparatus 16 conduits 44, 46, 48, 50, respectively. In addition, coating and drying apparatus 10 may also include electrical discharge devices, such as corona or glow discharge device 52, or polar charge assist device 54, to modify the film 12 prior to application of the coating.

The coating apparatus 16 used to deliver coating fluids to the moving film 12 may be a multi-layer applicator such as a slide bead hopper, as taught for example in U.S. Pat. No. 2,761,791 to Russell, or a slide curtain hopper, as taught by U.S. Pat. No. 3,508,947 to Hughes. Alternatively, the coating apparatus 16 may be a multi-manifold extrusion die or a single layer applicator, such as slot die bead hopper, an extrusion die, a wire-wound rod, a knife, an air knife, a blade, a gravure cylinder, a spray nozzle, or jet hopper. In one preferred embodiment of the present invention, the application device 16 is a multi-layer slide bead hopper, a multi-slot extrusion coating method or a multi-manifold extrusion die.

Figure 2:
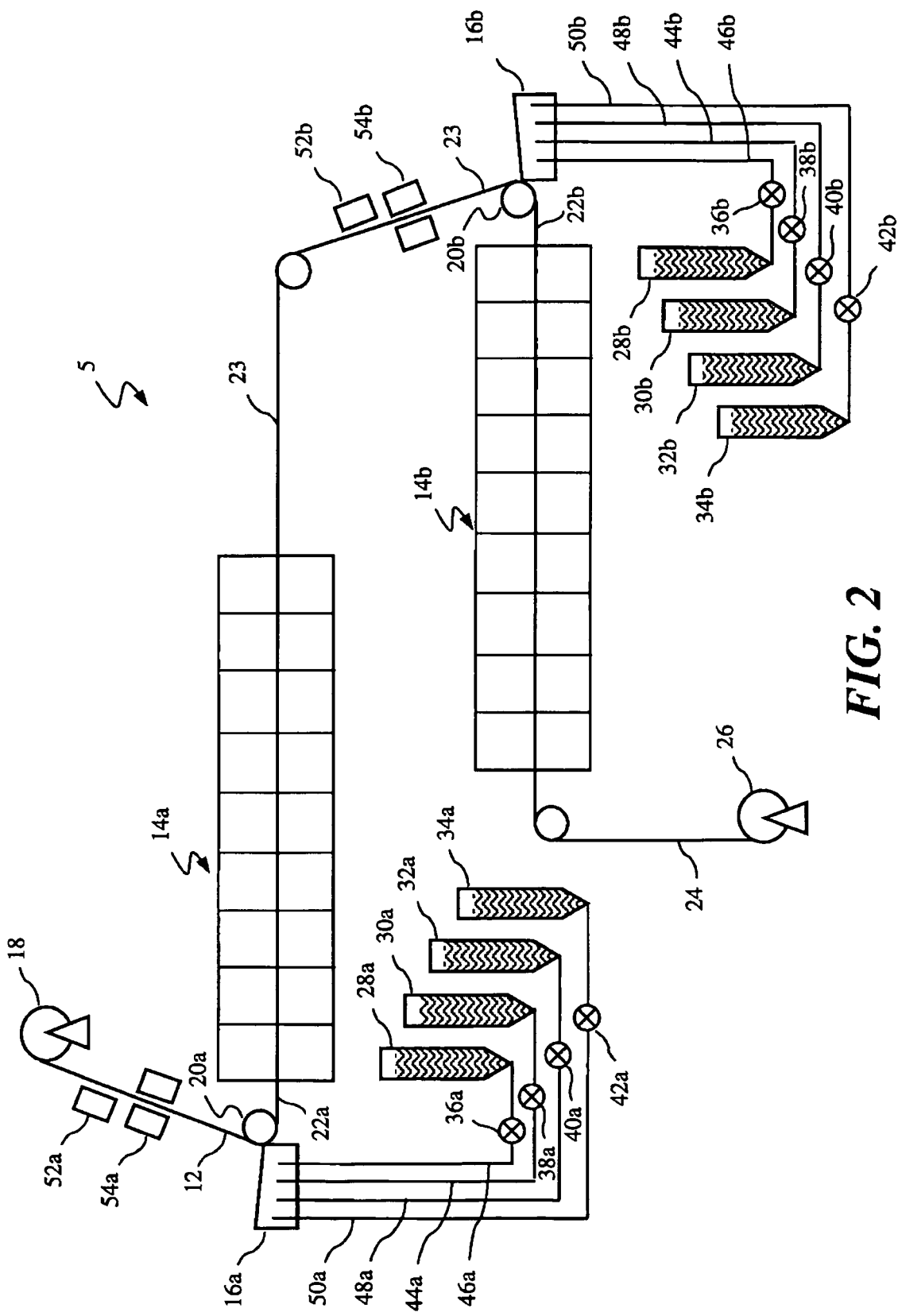
FIG. 2 is a schematic of a method to fabricate a polarizer plate in accordance with the present invention wherein the optical films on either side of the polarizing film are applied sequentially.

Turning next to FIG. 2 there is shown a schematic of an exemplary coating and drying system 5 that essentially comprises a tandem of the coating and drying apparatus depicted in FIG. 1. This system is particularly useful for sequential single or multi-layer coating on one side of a polarizing film. However, coating and drying system 5 further depicts winding station 26 to wind the polarizer plate 24 into rolls. Accordingly, the drawing in FIG. 2 is numbered in an analogous fashion to the drawing in FIG. 1 up to the winding station, with "a" designating the first coating and drying apparatus and "b" designating the second coating and drying apparatus. In the practice of the present invention the polarizing film 12 is supplied either directly from the polarizing film manufacturing process in a continuous sequential process or from a stock roll of previously prepared polarizing film that is fed from unwind station 18 and conveyed through electrical discharge devices, such as corona or glow discharge device 52a, or polar charge assist device 54a, to optionally modify the film 12 prior to application of the coating.

A first optical film coating solution is applied at coating apparatus 16a and the coated film 22a then proceeds through the dryer 14a where the first coating is dried to form optical film coated substrate 23. The side of the film 23 opposite to that previously coated in coating apparatus 16a is now conveyed through electrical discharge devices, such as corona or glow discharge device 52b, or polar charge assist device 54b, to optionally modify the surface prior to application of second optical film coating solution at coating apparatus 16b. Coated film 22b then proceeds through the dryer 14b where the second coating is dried to form polarizer plate 24, which may be wound into rolls at winding station 26.

Figure 3:
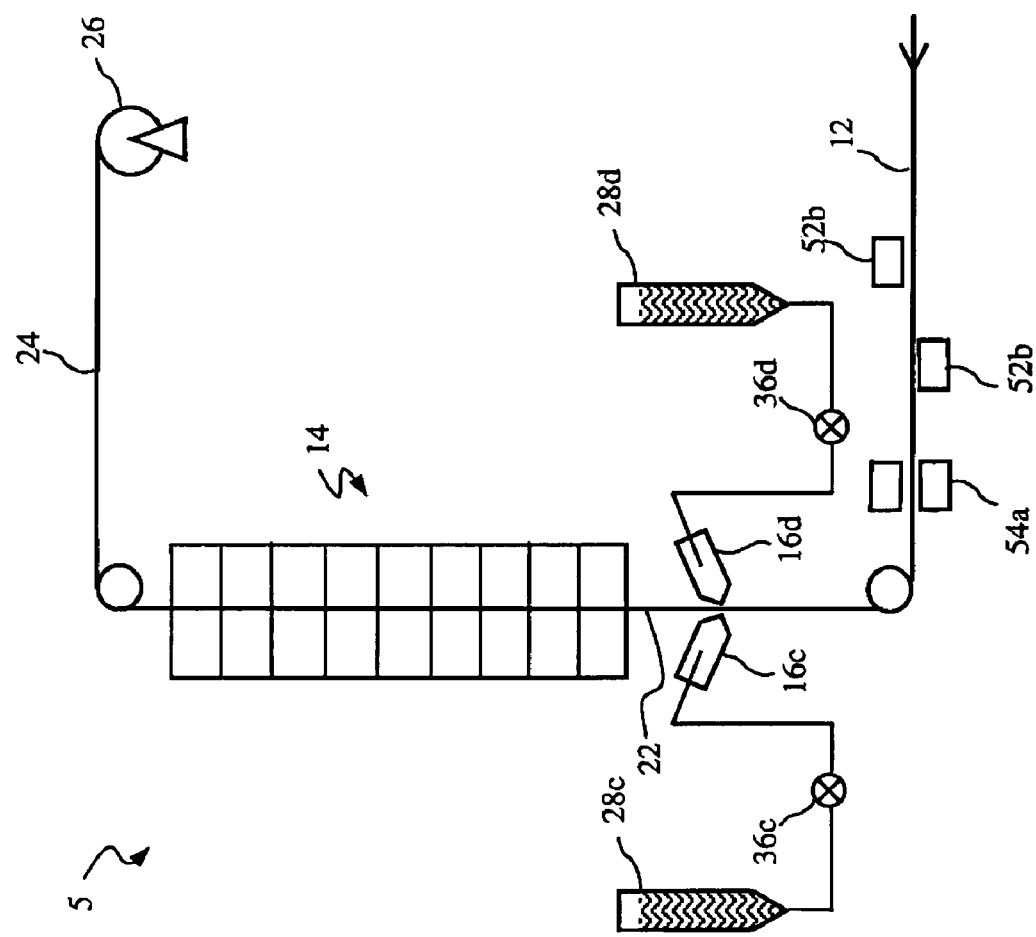
FIG. 3 is a schematic of a method to fabricate a polarizer plate in accordance with the present invention wherein the optical films on either side of the polarizing film are applied simultaneously or near simultaneously.

Turning next to FIG. 3 there is shown a schematic of an exemplary coating and drying system 8 suitable for simultaneously coating and drying a first and second optical film on a polarizing film. Simultaneously coating and drying implies that the both sides of the polarizing film are coated at the same time or nearly at the same time and then both sides of the film are dried at the same time in a single dryer. A suitable coating apparatus to deliver coating fluids to both sides of the moving polarizing film 12 at the same time is a duplex type coating apparatus as taught by U.S. Pat. No. 5,776,251 to Nobuaki. Alternatively, both sides of the film 12 can be coated at the same time using the dip or spray coating methods. Alternatively, both sides of the film 12 may be coated nearly at the same time using two closely spaced, but separate, coating apparatus. In this latter case a suitable coating apparatus for the first optical film solution is any of the previously mentioned coating apparatuses for single or tandem coatings and a suitable coating apparatus for the second optical film solution is any of the previously mentioned coating apparatuses that can be used without a backing roller. Examples of a coating apparatus that can be used without a backing roller and that can instead be operated in a free span of the web path by control of web tension are a single or multiple manifold extrusion die, a blade, a knife, an air knife, a spray nozzle, a wire-wound rod, or a gravure cylinder.

After application of the second optical film solution the coated polarizing film 22 then proceeds through the dryer 14 where both sides of the polarizing film are dried to form polarizer plate 24, which may be wound into rolls at winding station 26. It is necessary that a non-contacting web conveyance method be used from the coating application points until the coatings on both sides of the polarizing film are dried sufficiently so they will not to be damaged by contact. In particular, a vertical film path could be used as illustrated in FIG. 3 without the need for contact until conveyance element 15. The conveyance element in this case could be a roller or an air bar that relies on high air impingement pressure to float the coated film. In either case it is preferred that the coating that will come into contact with the roller or air bar be dried to at least 50% solids by weight prior to the contact. It is most preferred that the coating be dried to at least 80% solids by weight prior to contacting element 15. It is understood that, in general, dryer 14 could be oriented vertically as shown or in any other direction and that air impingement nozzles can be used within the dryer to accelerate the drying provided that the coating is not damaged. It is preferred that the polarizer film is in a vertical position when the optical film coating are applied.

Figure 4:
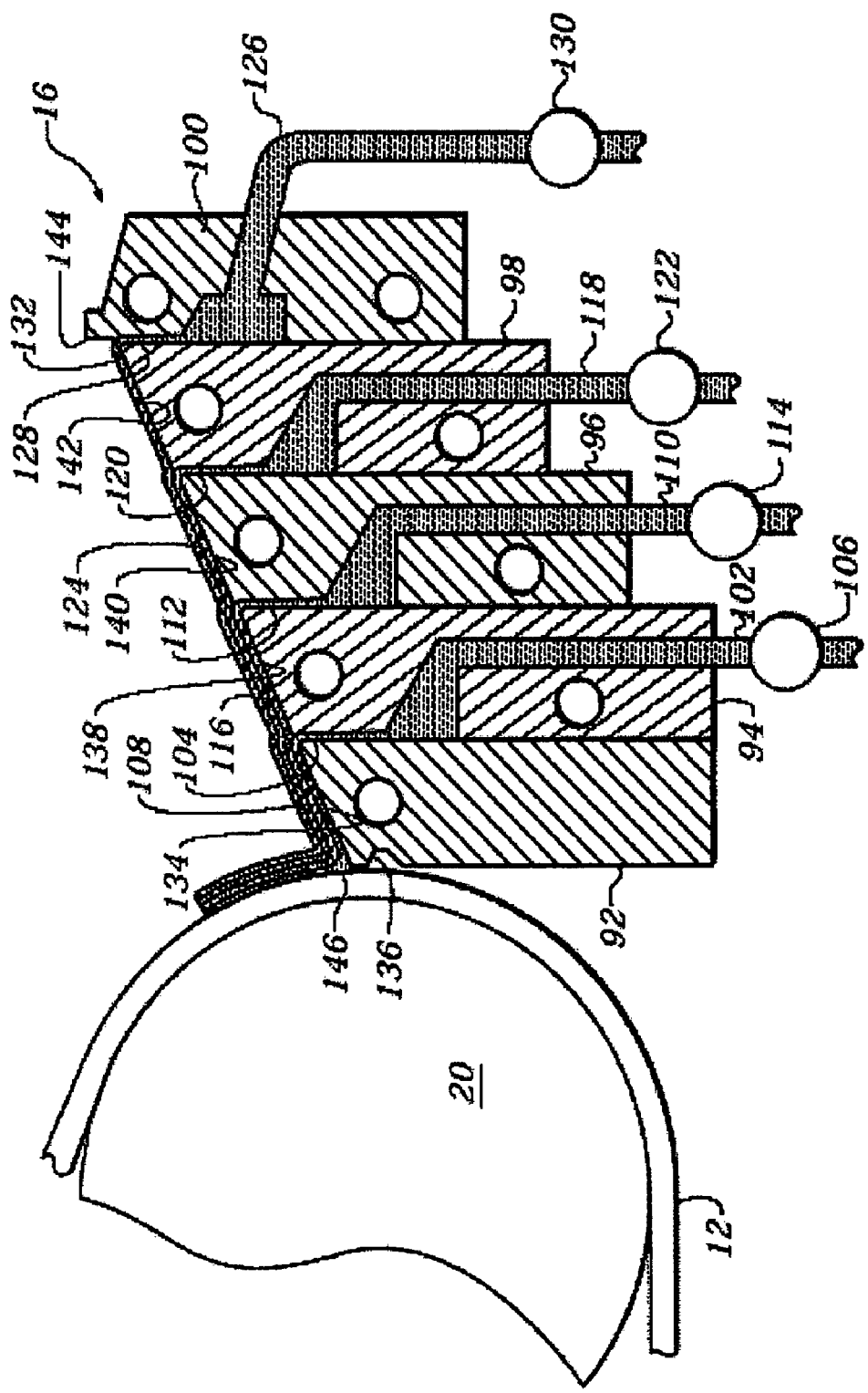
FIG. 4 is a schematic of an exemplary multi-slot coating apparatus that can be used in the practice of the present invention.

Referring now to FIG. 4, a schematic of one exemplary coating apparatus 16 is shown in detail. This apparatus is particularly useful for multi-layer coating on one side of a polarizing film. Coating apparatus 16, schematically shown in side elevational cross-section, includes a front section 92, a second section 94, a third section 96, a fourth section 98, and a back plate 100. There is an inlet 102 into second section 94 for supplying coating liquid to first metering slot 104 via pump 106 to thereby form a lowermost layer 108. There is an inlet 110 into third section 96 for supplying coating liquid to second metering slot 112 via pump 114 to form layer 116. There is an inlet 118 into fourth section 98 for supplying coating liquid to metering slot 120 via pump 122 to form layer 124. There is an inlet 126 into back plate 100 for supplying coating liquid to metering slot 128 via pump 130 to form layer 132. Each slot 104, 112, 120, 128 includes a transverse distribution cavity. Front section 92 includes an inclined slide surface 134, and a coating lip 136. There is a second inclined slide surface 138 at the top of second section 94. There is a third inclined slide surface 140 at the top of third section 96. There is a fourth inclined slide surface 142 at the top of fourth section 98. Back plate 100 extends above inclined slide surface 142 to form a back land surface 144. Residing adjacent the coating apparatus or hopper 16 is a coating backing roller 20 about which a film 12 is conveyed. Coating layers 108, 116, 124, 132 form a multi-layer composite which forms a coating bead 146 between lip 136 and substrate 12. Typically, the coating hopper 16 is movable from a non-coating position toward the coating backing roller 20 and into a coating position. Although coating apparatus 16 is shown as having four metering slots, coating dies having a larger number of metering slots (as many as nine or more) are well known and may be used to practice the method of the present invention.

For the purpose of the present invention, the coating fluids are comprised principally of a polymer binder dissolved in an organic solvent. In a particularly preferred embodiment, the optical film (first, second or both) comprises a low birefringence polymer film comprising a cellulose ester. Cellulose esters are commercially available in a variety of molecular weight sizes as well as in the type and degree of alkyl substitution of the hydroxyl groups on the cellulose backbone. Examples of cellulose esters include those having acetyl, propionyl and butyryl groups. Of particular interest is the family of cellulose esters with acetyl substitution known as cellulose acetate. Of these, the fully acetyl substituted cellulose having a combined acetic acid content of approximately 58.0-62.5% is known as triacetyl cellulose (TAC) and is generally preferred for preparing optical films used in electronic displays.

In terms of organic solvents for TAC, suitable solvents, for example, include chlorinated solvents (methylene chloride and 1,2 dichloroethane), alcohols (methanol, ethanol, n-propanol, isopropanol, n-butanol, isobutanol, diacetone alcohol and cyclohexanol), ketones (acetone, methylethyl ketone, methylisobutyl ketone, and cyclohexanone), esters (methyl acetate, ethyl acetate, n-propyl acetate, isopropyl acetate, isobutyl acetate, n-butyl acetate, and methylacetoacetate), aromatics (toluene and xylenes) and ethers (1,3-dioxolane, 1,2-dioxolane, 1,3-dioxane, 1,4-dioxane, and 1,5-dioxane). In some applications, small amounts of water may be used. Normally, TAC solutions are prepared with a blend of the aforementioned solvents. Preferred primary solvents include methylene chloride, acetone, methyl acetate, and 1,3-dioxolane. Preferred co-solvents for use with the primary solvents include methanol, ethanol, n-butanol and water.

Optical film coating formulations may also contain plasticizers. Appropriate plasticizers for TAC films include phthalate esters (dimethylphthalate, dimethoxyethyl phthalate, diethylphthalate, dibutylphthalate, dioctylphthalate, didecylphthalate and butyl octylphthalate), adipate esters (dioctyl adipate), and phosphate esters (tricresyl phosphate, biphenylyl diphenyl phosphate, cresyl diphenyl phosphate, octyl diphenyl phosphate, tributyl phosphate, and triphenyl phosphate), glycolic acid esters (triacetin, tributyrin, butyl phthalyl butyl glycolate, ethyl phthalyl ethyl glycolate, and methyl phthalyl ethyl glycolate. Also useful are the plasticizers described in U.S. patent application Ser. No. 10/945,305, filed Sep. 20, 2004 incorporated herein by reference. Plasticizers are normally used to improve the physical and mechanical properties of the final film. In particular, plasticizers are known to improve the flexibility and dimensional stability of cellulose acetate films. However, plasticizers are also used here as coating aids in the converting operation to minimize premature film solidification at the coating hopper and to improve drying characteristics of the wet film. In the method of the present invention, plasticizers are used to minimize blistering, curl and delamination of TAC films during the drying operation. In a preferred embodiment of the present invention, plasticizers are added to the coating fluid at a total concentration of up to 50% by weight relative to the concentration of polymer in order to mitigate defects in the final TAC film.

The coating formulation for the optical film may also contain one or more UV absorbing compounds to provide UV filter element performance and/or act as UV stabilizers for the low birefringence polymer film. Ultraviolet absorbing compounds are generally contained in the polymer in an amount of 0.01 to 20 weight parts based on 100 weight parts of the polymer containing no ultraviolet absorber, and preferably contained in an amount of 0.01 to 10 weight parts, especially in an amount of 0.05 to 2 weight parts. Any of the various ultraviolet light absorbing compounds which have been described for use in various polymeric elements may be employed in the polymeric elements of the invention, such as hydroxyphenyl-s-triazine, hydroxyphenylbenzotriazole, formamidine, or benzophenone compounds. As described in copending, commonly assigned U.S. patent application Ser. No. 10/150,634, filed May 5, 2002, the use of dibenzoylmethane ultraviolet absorbing compounds in combination with a second UV absorbing compound such as those listed above have been found to be particularly advantageous with respect to providing both a sharp cut off in absorption between the UV and visible light spectral regions as well as increased protection across more of the UV spectrum. Additional possible UV absorbers which may be employed include salicylate compounds such as 4-t-butylphenylsalicylate; and [2,2'thiobis-(4-t-octylphenolate)]$_n$-butylamine nickel(II). Most preferred are combinations of dibenzoylmethane compounds with hydroxyphenyl-s-triazine or hydroxyphenylbenzotriazole compounds.

Dibenzoylmethane compounds which may be employed include those of the formula (IV)

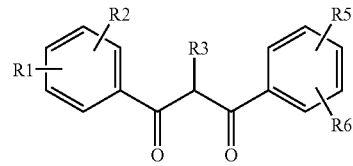

where R1 through R5 are each independently hydrogen, halogen, nitro, or hydroyxl, or further substituted or unsubstituted alkyl, alkenyl, aryl, alkoxy, acyloxy, ester, carboxyl, alkyl thio, aryl thio, alkyl amine, aryl amine, alkyl nitrile, aryl nitrile, arylsulfonyl, or 5-6 member heterocycle ring groups. Preferably, each of such groups comprises 20 or fewer carbon atoms. Further preferably, R1 through R5 of Formula IV are positioned in accordance with Formula IV-A:

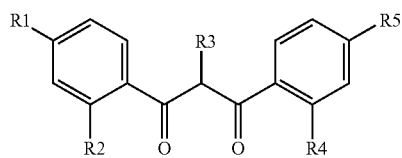

Particularly preferred are compounds of Formula IV-A where R1 and R5 represent alkyl or alkoxy groups of from 1-6 carbon atoms and R2 through R4 represent hydrogen atoms.

Representative compounds of Formula (IV) which may be employed in accordance the elements of the invention include the following:

(IV-1): 4-(1,1-dimethylethyl)-4'-methoxydibenzoylmethane (PARSOL® 1789)

(IV-2): 4-isopropyl dibenzoylmethane (EUSOLEX® 8020)

(IV-3): dibenzoylmethane (RHODIASTAB® 83)

Hydroxyphenyl-s-triazine compounds which may be used in the elements of the invention, e.g., may be a derivative of tris-aryl-s-triazine compounds as described in U.S. Pat. No. 4,619,956. Such compounds may be represented by Formula V:

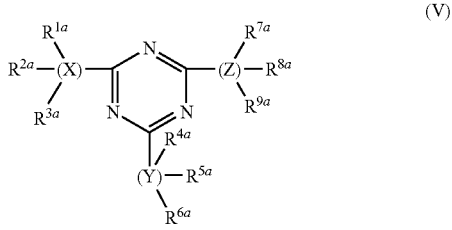

(V)

wherein X, Y and Z are each aromatic, carbocylic radicals of less than three 6-membered rings, and at least one of X, Y and Z is substituted by a hydroxy group ortho to the point of attachment to the triazine ring; and each of $R^{1a}$ through $R^{9a}$ is selected from the group consisting of hydrogen, hydroxy, alkyl, alkoxy, sulfonic, carboxy, halo, haloalkyl and acylamino. Particularly preferred are hydroxyphenyl-s-triazines of the formula V-A:

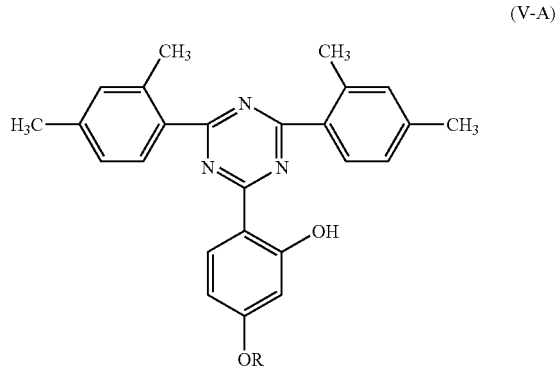

(V-A)

wherein R is hydrogen or alkyl of 1-18 carbon atoms.

Hydroxyphenylbenzotriazole compounds which may be used in the elements of the invention, e.g., may be a derivative of compounds represented by Formula VI:

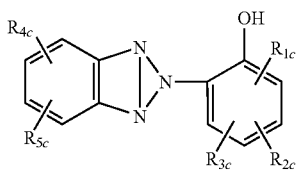

(VI)

wherein $R_{1c}$ through $R_{5c}$ may be independently hydrogen, halogen, nitro, hydroxy, or further substituted or unsubstituted alkyl, alkenyl, aryl, alkoxy, acyloxy, aryloxy, alkylthio, mono or dialkyl amino, acyl amino, or heterocyclic groups. Specific examples of benzotriazole compounds which may be used in accordance with the invention include 2-(2'-hydroxy-3'-t-butyl-5'-methylphenyl)-5-chlorobenzotriazole; 2-(2'-hydroxy-3',5'-di-t-amylphenyl)benzotriazole; octyl 5-tert-butyl-3-(5-chloro-2H-benzotriazole-2-yl)-4-hydroxybenzenepropionate; 2-(hydroxy-5-t-octylphenyl) benzotriazole; 2-(2'-hydroxy-5'-methylphenyl) benzotriazole; 2-(2'-hydroxy-3'-dodecyl-5'-methylphenyl) benzotriazole; and 2-(2'-hydroxy-3',5'-di-t-butylphenyl)-5-chlorobenzotriazole.

Formamidine compounds which may be used in the elements of the invention, e.g., may be a formamidine compound as described in U.S. Pat. No. 4,839,405. Such compounds may be represented by Formula VII or Formula VIII:

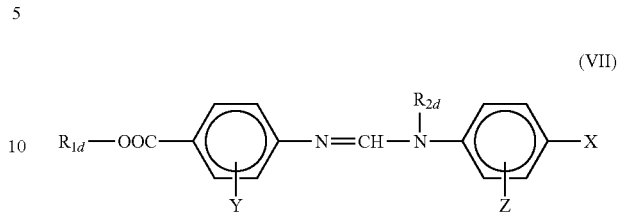

(VII)

wherein $R_{1d}$ is an alkyl group containing 1 to about 5 carbon atoms; Y is a H, OH, Cl or an alkoxy group; $R_{2d}$ is a phenyl group or an alkyl group containing 1 to about 9 carbon atoms; X is selected from the group consisting of H, carboalkoxy, alkoxy, alkyl, dialkylamino and halogen; and Z is selected from the group consisting of H, alkoxy and halogen;

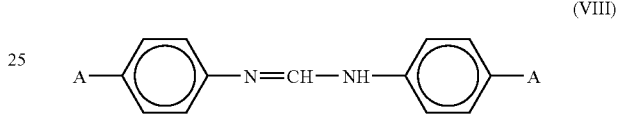

(VIII)

wherein A is —COOR, —COOH, —CONR'R", —NR'COR, —CN, or a phenyl group; and wherein R is an alkyl group of from 1 to about 8 carbon atoms; R' and R" are each independently hydrogen or lower alkyl groups of from 1 to about 4 carbon atoms. Specific examples of formamidine compounds which may be used in accordance with the invention include those described in U.S. Pat. No. 4,839,405, and specifically 4-[[(methylphenylamino)methylene]amino]-ethyl ester.

Benzophenone compounds which may be used in the elements of the invention, e.g., may include 2,2'-dihydroxy-4,4'dimethoxybenzophenone, 2-hydroxy-4-methoxybenzophenone and 2-hydroxy-4-n-dodecyloxybenzophenone.

Optical film coating formulations may also contain surfactants as coating aids to control artifacts related to flow after coating. Artifacts created by flow after coating phenomena include mottle, repellencies, orange-peel (Bernard cells), and edge-withdraw. Surfactants used control flow after coating artifacts include siloxane and fluorochemical compounds. Examples of commercially available surfactants of the siloxane type include: 1.) Polydimethylsiloxanes such as DC200 Fluid from Dow Corning, 2.) Poly(dimethyl, methylphenyl) siloxanes such as DC510 Fluid from Dow Corning, and 3.) Polyalkyl substituted polydimethysiloxanes such as DC190 and DC1248 from Dow Corning as well as the L7000 Silwet series (L7000, L7001, L7004 and L7230) from Union Carbide, and 4.) Polyalkyl substituted poly(dimethyl, methylphenyl)siloxanes such as SF1023 from General Electric. Examples of commercially available fluorochemical surfactants include: 1.) Fluorinated alkyl esters such as the Fluorad series (FC430 and FC431) from the 3M Corporation, 2.) Fluorinated polyoxyethylene ethers such as the Zonyl series (FSN, FSN100, FSO, FSO100) from Du Pont, 3.) Acrylate: polyperfluoroalkyl ethylacrylates such as the F series (F270 and F600) from NOF Corporation, and 4.) Perfluoroalkyl derivatives such as the Surflon series (S383, S393, and S8405) from the Asahi Glass Company. In the method of the present invention, surfactants are generally of the non-ionic type. In a preferred embodiment of the present invention, non-ionic compounds of either the siloxane or fluorinated type are added to the uppermost layers.

In terms of surfactant distribution, surfactants are most effective when present in the uppermost layers of the multi-layer coating. In the uppermost layer, the concentration of surfactant is preferably 0.001-1.000% by weight and most preferably 0.010-0.500%. In addition, lesser amounts of surfactant may be used in the second uppermost layer to minimize diffusion of surfactant into the lowermost layers. The concentration of surfactant in the second uppermost layer is preferably 0.000-0.200% by weight and most preferably between 0.000-0.100% by weight. Because surfactants are only necessary in the uppermost layers, the overall amount of surfactant remaining in the final dried film is small. In the method of the present invention, a practical surfactant concentration in the uppermost layer having a wet thickness of 20 µm and a density of 0.93 g/cc is 0.200% by weight which after drying gives a final surfactant amount of approximately 37 mg/sq-m.

Although surfactants are not required to practice the method of the current invention, surfactants do improve the uniformity of the coated film. In particular, mottle nonuniformities are reduced by the use of surfactants. In transparent cellulose acetate films, mottle nonuniformities are not readily visualized during casual inspection. To visualize mottle artifacts, organic dyes may be added to the uppermost layer to add color to the coated film. For these dyed films, nonuniformities are easy to see and quantify. In this way, effective surfactant types and levels may be selected for optimum film uniformity.

Optical film coating formulations may also contain crosslinking agents to improve the chemical and physical durability of the film. Suitable crosslinking agents include aldehydes and related compounds, pyridiniums, olefins such as bis(vinylsulfonyl methyl) ether, carbodiimides, epoxides, triazines, polyfunctional aziridines, methoxyalkyl melamines, polyisocyanates, and the like. Additional crosslinking agents that may also be successfully employed in the optical film coating formulation include multivalent metal ion such as zinc, calcium, zirconium and titanium. The appropriate crosslinking agent or combination of crosslinking agents is selected to react with the particular functional group(s) present in polymer binder contained in the optical film layer.

The preparation of the polarizer plates using the method of the present invention may also include the step of coating over a previously coated and dried optical film layer. For example, the coating and drying apparatus and systems shown in FIGS. 1 through 4 may be used to apply a second optical film layer or layers (for example, an antiglare layer) to an existing low birefringence polymer film. If the coated polarizing film is wound into rolls before applying the subsequent coating, the process is called a multi-pass coating operation. If coating and drying operations are carried out sequentially on a machine with multiple coating stations and drying ovens, then the process is called a tandem coating operation. In this way, thick optical films may be applied at high line speeds without the problems associated with the removal of large amounts of solvent from a very thick wet optical film. Moreover, the practice of multi-pass or tandem coating also has the advantage of minimizing other artifacts such as streak severity, mottle severity, and overall optical film nonuniformity.

Figure 5:
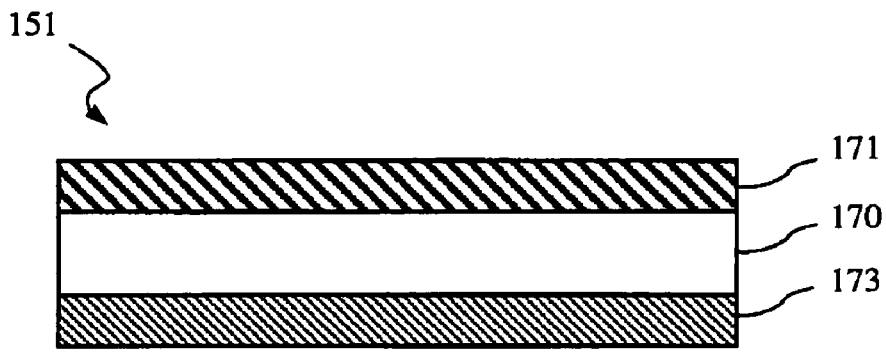
FIG. 5 shows a cross-sectional representation of a polarizer plate prepared by the method of the invention comprising an optical film on each side of a polarizing film.
Figure 6:
FIG. 6 shows a cross-sectional representation of a polarizer plate prepared by the method of the invention comprising a multi-layer optical film on each side of a polarizing film.
Figure 7:
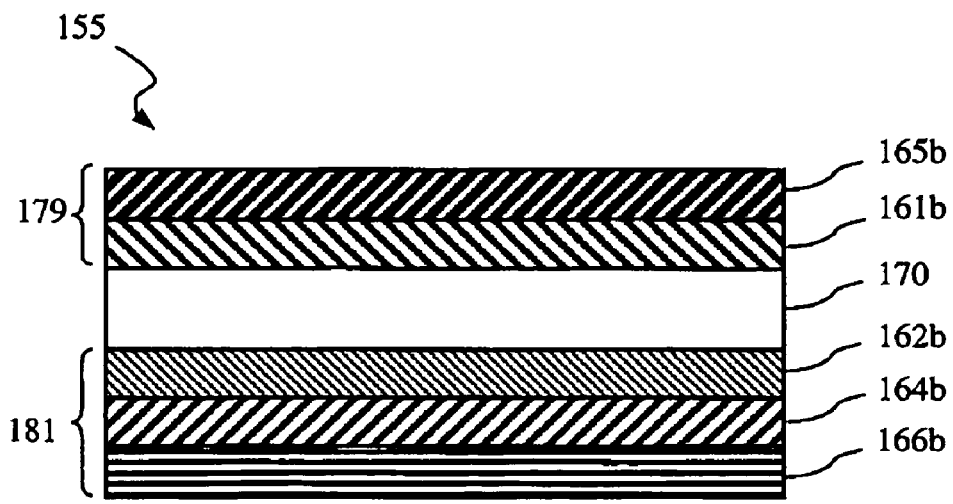
FIG. 7 shows a cross-sectional representation of a polarizer plate prepared by the method of the invention comprising a multi-layer optical film on each side of a polarizing film.

Turning next to FIGS. 5 through 7, there are presented cross-sectional illustrations showing various polarizer plates that may be prepared with the methods of the present invention. In FIG. 5, a simple polarizer plate 151 comprising optical film 171 and 173 on each side of a polarizing film 170 is shown. In this illustration, optical films 171 and 173 could be a first and a second low birefringence polymer film, respectively. Optical film 171 and 173 may be formed by simultaneously applying liquid coatings on each side of the polarizing film 170 and then drying the layers in a single drying operation, or each side of the polarizing film 170 may be coated and dried in a sequential operation.

FIG. 6 illustrates another polarizer plate 153 comprising a first optical film stack 175 that is comprised of, for example, three compositionally discrete optical films including a lowermost film 161a nearest to the polarizing film 170, an intermediate film 163a, and an uppermost film 165a. On the side of the polarizing film opposite to first optical film stack 175 is an optical film stack 177 that is comprised of, for example, two compositionally discrete optical films including a lowermost film 162a nearest to the polarizing film 170 and an uppermost film 166a. In this illustration, films 161a and 162a could be a tie layer that promotes adhesion to a PVA polarizing film, films 163a and 166a could be a first and a second low birefringence polymer film, respectively, and film 165a could be an abrasion resistant hard coat layer, for example. The coating and drying operations that may effectively be employed to form polarizer plate 153 are analogous to those described in FIG. 5 above.

FIG. 7 illustrates a further polarizer plate 155 comprising multi-layer optical film stacks 179 and 181. First optical film stack 179 has lowermost film 161b, and outermost film 165b and second optical film 181 has lowermost film 162b, intermediate film 164b and outermost film 166b. In this illustration, films 161b and 162b could be a tie layer that promotes adhesion to a PVA polarizing film, film 164b could be a hard coat layer, film 166b could be a low reflection layer, and film 165b could be a compensation layer, for example. The coating and drying operations that may effectively be employed to form polarizer plate 155 are analogous to those described in FIG. 5 above.

FIGS. 5 through 7 serve to illustrate some of the polarizer plates that may be constructed based on the detailed teachings provided hereinabove, they are not intended to be exhaustive of all possible variations of the invention. One skilled in the art could conceive of many other layer combinations that would be useful as polarizer plates for use in LCDs.

Figure 8:
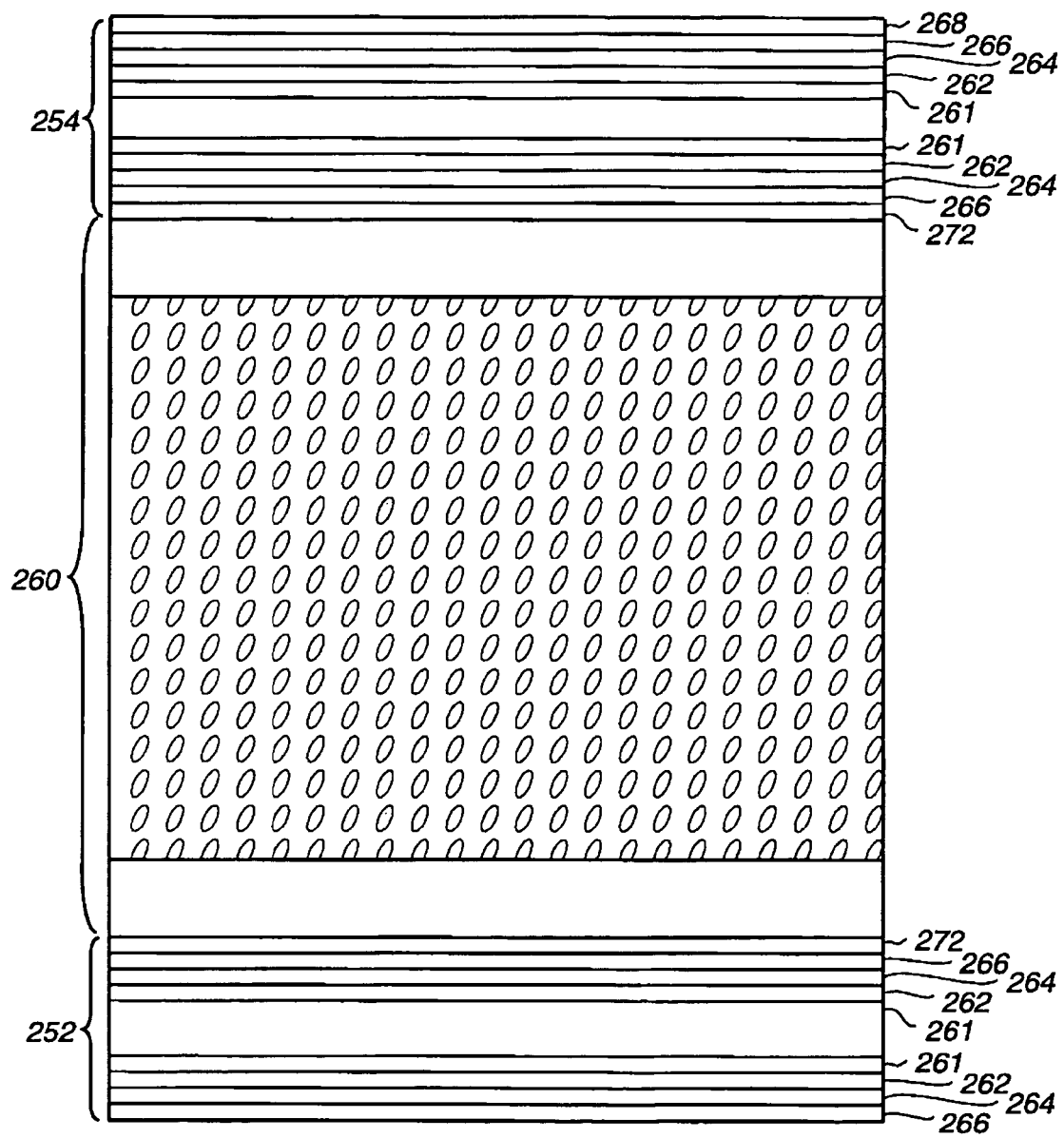
FIG. 8 shows a cross-sectional representation of a liquid crystal cell with polarizer plates on either side of the cell.

FIG. 8 presents a cross-sectional illustration showing a liquid crystal cell 260 having polarizer plates 252 and 254 disposed on either side. Polarizer plate 254 is on the side of the LCD cell closest to the viewer. Each polarizer plate employs at least one optical film on each side of the polarizing film. For the purpose of illustration, polarizer plate 254 is shown with an optical film stack (this is the optical film stack closest to the viewer) comprising a tie layer 261 that promotes adhesion to a PVA polarizing film, low birefringence polymer film 262, moisture barrier layer 264, antistatic layer 266, and antiglare layer 268. The lowermost optical films contained in polarizer plate 254 comprise a tie layer 261 that promotes adhesion to a PVA polarizing film, low birefringence polymer film 262, moisture barrier layer 264, antistatic layer 266, and viewing angle compensation layer 272. On the opposite side of the LCD cell, polarizer plate 252 is shown with an uppermost optical film stack, which for the purpose of illustration, comprises a tie layer 261 that promotes adhesion to a PVA polarizing film, low birefringence polymer film 262, moisture barrier layer 264, antistatic layer 266, and viewing angle compensation layer 272. Polarizer plate 252 also has a lowermost optical film stack comprising a tie layer that promotes adhesion to a PVA polarizing film, low birefringence polymer film 262, moisture barrier layer 264, and antistatic layer 266.

In accordance with the present invention the thickness, the number of optical films (or layers), and the composition of the first optical film stack may be the same or different from the second optical film stack. The thickness, number of optical films (or layers), and composition of each optical film will be chosen in order to satisfy the design and performance requirements for the polarizer plate being fabricated and/or provide the needed flatness or freedom from film curl for the polarizer plate. Polarizer plates fabricated from conventional cover sheets comprising a low birefringence polymer film thickness of about 80 micrometers have a total thickness of at least 180 micrometers. In a preferred embodiment of the current invention, polarizer plates prepared by the methods of the invention have a total thickness of less than 110 micrometers, and most preferably less than 80 micrometers.

Low birefringence polymer films suitable for use in the present invention comprise polymeric materials having low Intrinsic Birefringence $\Delta n_{int}$ that form high clarity films with high light transmittance (i.e., >85%). Preferably, the low birefringence polymer film has in-plane birefringence, $\Delta n_{in}$ of less than about $1 \times 10^{-4}$ and an out-of-plane birefringence, $\Delta n_{th}$ of from 0.005 to –0.005.

Exemplary polymeric materials for use in the low birefringence polymer films of the invention include cellulose esters (including triacetyl cellulose (TAC), cellulose diacetate, cellulose acetate butyrate, cellulose acetate propionate), polycarbonates (such as Lexan® available from General Electric Corp.), polysulfones (such as Udel® available from Amoco Performance Products Inc.), polyacrylates, and cyclic olefin polymers (such as Arton® available from JSR Corp., Zeonex® and Zeonor® available from Nippon Zeon, Topas® supplied by Ticona), among others. Preferably, the low birefringence polymer films of the invention comprises TAC, polycarbonate, or cyclic olefin polymers due to their commercial availability and excellent optical properties.

The low birefringence polymer films have a thickness from about 5 to 100 micrometers, preferably from about 5 to 40 micrometers and most preferably from about 5 to 20 micrometers. Films having thickness of 5 to 20 micrometers are most preferred due to cost, handling, ability to provide thinner polarizer plates, and improved light transmission. Polarizer plates fabricated from conventional cover sheets comprising a low birefringence polymer film thickness of about 80 micrometers have a total thickness of at least 180 micrometers. In a preferred embodiment of the current invention, polarizer plates prepared by the methods of the invention have a total thickness of less than 120 micrometers, and most preferably less than 80 micrometers.

Particularly effective abrasion resistant hard coat layers for use in the present invention comprise radiation or thermally cured compositions, and preferably the composition is radiation cured. Ultraviolet (UV) radiation and electron beam radiation are the most commonly employed radiation curing methods. UV curable compositions are particularly useful for creating the abrasion resistant layer of this invention and may be cured using two major types of curing chemistries, free radical chemistry and cationic chemistry. Acrylate monomers (reactive diluents) and oligomers (reactive resins and lacquers) are the primary components of the free radical based formulations, giving the cured coating most of its physical characteristics. Photo-initiators are required to absorb the UV light energy, decompose to form free radicals, and attack the acrylate group C=C double bond to initiate polymerization. Cationic chemistry utilizes cycloaliphatic epoxy resins and vinyl ether monomers as the primary components. Photo-initiators absorb the UV light to form a Lewis acid, which attacks the epoxy ring initiating polymerization. By UV curing is meant ultraviolet curing and involves the use of UV radiation of wavelengths between 280 and 420 nm preferably between 320 and 410 nm.

Examples of UV radiation curable resins and lacquers usable for the hard coat layer useful in this invention are those derived from photo polymerizable monomers and oligomers such as acrylate and methacrylate oligomers (the term "(meth)acrylate" used herein refers to acrylate and methacrylate), of polyfunctional compounds, such as polyhydric alcohols and their derivatives having (meth)acrylate functional groups such as ethoxylated trimethylolpropane tri(meth)acrylate, tripropylene glycol di(meth)acrylate, trimethylolpropane tri(meth)acrylate, diethylene glycol di(meth)acrylate, pentaerythritol tetra(meth)acrylate, pentaerythritol tri(meth)acrylate, dipentaerythritol hexa(meth)acrylate, 1,6-hexanediol di(meth)acrylate, or neopentyl glycol di(meth)acrylate and mixtures thereof, and acrylate and methacrylate oligomers derived from low-molecular weight polyester resin, polyether resin, epoxy resin, polyurethane resin, alkyd resin, spiroacetal resin, epoxy acrylates, polybutadiene resin, and polythiol-polyene resin, and the like and mixtures thereof, and ionizing radiation-curable resins containing a relatively large amount of a reactive diluent. Reactive diluents usable herein include monofunctional monomers, such as ethyl(meth)acrylate, ethylhexyl (meth)acrylate, styrene, vinyltoluene, and N-vinylpyrrolidone, and polyfunctional monomers, for example, trimethylolpropane tri(meth)acrylate, hexanediol (meth)acrylate, tripropylene glycol di(meth)acrylate, diethylene glycol di(meth)acrylate, pentaerythritol tri(meth)acrylate, dipentaerythritol hexa(meth)acrylate, 1,6-hexanediol di(meth)acrylate, or neopentyl glycol di(meth)acrylate.

Among others, in the present invention, conveniently used radiation curable lacquers include urethane (meth)acrylate oligomers. These are derived from reacting diisocyanates with a oligo(poly)ester or oligo(poly)ether polyol to yield an isocyanate terminated urethane. Subsequently, hydroxy terminated acrylates are reacted with the terminal isocyanate groups. This acrylation provides the unsaturation to the ends of the oligomer. The aliphatic or aromatic nature of the urethane acrylate is determined by the choice of diisocyanates. An aromatic diisocyanate, such as toluene diisocyanate, will yield an aromatic urethane acrylate oligomer. An aliphatic urethane acrylate will result from the selection of an aliphatic diisocyanate, such as isophorone diisocyanate or hexyl methyl diisocyanate. Beyond the choice of isocyanate, polyol backbone plays a pivotal role in determining the performance of the final the oligomer. Polyols are generally classified as esters, ethers, or a combination of these two. The oligomer backbone is terminated by two or more acrylate or methacrylate units, which serve as reactive sites for free radical initiated polymerization. Choices among isocyanates, polyols, and acrylate or methacrylate termination units allow considerable latitude in the development of urethane acrylate oligomers. Urethane acrylates like most oligomers, are typically high in molecular weight and viscosity. These oligomers are multifunctional and contain multiple reactive sites. Because of the increased number of reactive sites, the cure rate is improved and the final product is cross-linked. The oligomer functionality can vary from 2 to 6.

Among others, conveniently used radiation curable resins include polyfunctional acrylic compounds derived from polyhydric alcohols and their derivatives such as mixtures of acrylate derivatives of pentaerythritol such as pentaerythritol tetraacrylate and pentaerythritol triacrylate functionalized aliphatic urethanes derived from isophorone diisocyanate. Some examples of urethane acrylate oligomers used in the practice of this invention that are commercially available include oligomers from Sartomer Company (Exton, Pa.). An example of a resin that is conveniently used in the practice of this invention is CN 968® from Sartomer Company.

A photo polymerization initiator, such as an acetophenone compound, a benzophenone compound, Michler's benzoyl benzoate, α-amyloxime ester, or a thioxanthone compound and a photosensitizer such as n-butyl amine, triethylamine, or tri-n-butyl phosphine, or a mixture thereof is incorporated in the ultraviolet radiation curing composition. In the present invention, conveniently used initiators are 1-hydroxycyclohexyl phenyl ketone and 2-methyl-1-[4-(methyl thio)phenyl]-2-morpholinopropanone-1.

The abrasion resistant hard coat layer may be applied simultaneously with other optical film layers or after coating and drying another optical film layer such as a tie layer or low birefringence polymer film, for example. The hard coat layer of this invention is applied as a coating composition that typically also includes organic solvents. Preferably the concentration of organic solvent is 1-99% by weight of the total coating composition.

Examples of solvents employable for coating the abrasion resistant hard coat layer of this invention include solvents such as methanol, ethanol, propanol, butanol, cyclohexane, heptane, toluene and xylene, esters such as methyl acetate, ethyl acetate, propyl acetate and mixtures thereof. With the proper choice of solvent, adhesion of the hard coat layer to previously coated and dried optical film layers can be improved while minimizing migration of addenda such as plasticizers from these previously coated and dried layers, enabling the hardness of the abrasion resistant hard coat layer to be maintained. Suitable solvents for overcoating, for example, a previously coated and dried TAC low birefringence polymer films are aromatic hydrocarbon and ester solvents such as toluene and propyl acetate.

The UV polymerizable monomers and oligomers are coated and dried, and subsequently exposed to UV radiation to form an optically clear cross-linked abrasion resistant hard coat layer. The preferred UV cure dosage is between 50 and 1000 mJ/cm$^2$.

The thickness of the abrasion resistant hard coat layer is generally about 0.5 to 50 micrometers preferably 1 to 20 micrometers, more preferably 2 to 10 micrometers.

The abrasion resistant hard coat layer is preferably colorless, but it is specifically contemplated that this layer can have some color for the purposes of color correction, or for special effects, so long as it does not detrimentally affect the formation or viewing of the display through the overcoat. Thus, there can be incorporated into the polymer dyes that will impart color. In addition, additives can be incorporated into the polymer that will give to the layer desired properties. Other additional compounds may be added to the coating composition, including surfactants, emulsifiers, coating aids, lubricants, matte particles, rheology modifiers, crosslinking agents, antifoggants, inorganic fillers such as conductive and nonconductive metal oxide particles, pigments, magnetic particles, biocide, and the like.

The abrasion resistant hard coat layer of the invention typically provides a layer having a pencil hardness (using the Standard Test Method for Hardness by Pencil Test ASTM D3363) of at least 2 H and preferably 2 H to 8 H.

The optical films of the invention may include an antiglare layer, a low reflection layer or an antireflection layer. Such layers are employed in an LCD in order to improve the viewing characteristics of the display, particularly when it is viewed in bright ambient light. The refractive index of an abrasion resistant, hard coat is about 1.50, while the index of the surrounding air is 1.00. This difference in refractive index produces a reflection from the surface of about 4%.

An antiglare layer provides a roughened or textured surface that is used to reduce specular reflection. All of the unwanted reflected light is still present, but it is scattered rather than specularly reflected. For the purpose of the present invention, the antiglare layer preferably comprises a radiation cured composition that has a textured or roughened surface obtained by the addition of organic or inorganic (matting) particles or by embossing the surface. The radiation cured compositions described hereinabove for the abrasion resistant hard coat layer are also effectively employed in the antiglare layer. Surface roughness is preferably obtained by the addition of matting particles to the radiation cured composition. Suitable particles include inorganic compounds having an oxide, nitride, sulfide or halide of a metal, metal oxides being particularly preferred. As the metal atom, Na, K, Mg, Ca, Ba, Al, Zn, Fe, Cu, Ti, Sn, In, W, Y, Sb, Mn, Ga, V, Nb, Ta, Ag, Si, B, Bi, Mo, Ce, Cd, Be, Pb and Ni are suitable, and Mg, Ca, B and Si are more preferable. An inorganic compound containing two types of metal may also be used. A particularly preferable inorganic compound is silicon dioxide, namely silica.

Additional particles suitable for use in the antiglare layer of the present invention include the layered clays described in commonly-assigned U.S. patent application Ser. No. 10/690,123, filed Oct. 21, 2003. The most suitable layered particles include materials in the shape of plates with high aspect ratio, which is the ratio of a long direction to a short direction in an asymmetric particle. Preferred layered particles are natural clays, especially natural smectite clay such as montmorillonite, nontronite, beidellite, volkonskoite, hectorite, saponite, sauconite, sobockite, stevensite, svinfordite, halloysite, magadiite, kenyaite and vermiculite as well as layered double hydroxides or hydrotalcites. Most preferred clay materials include natural montmorillonite, hectorite and hydrotalcites, because of commercial availability of these materials.

The layered materials suitable for this invention may comprise phyllosilicates, for example, montmorillonite, particularly sodium montmorillonite, magnesium montmorillonite, and/or calcium montmorillonite, nontronite, beidellite, volkonskoite, hectorite, saponite, sauconite, sobockite, stevensite, svinfordite, vermiculite, magadiite, kenyaite, talc, mica, kaolinite, and mixtures thereof. Other useful layered materials may include illite, mixed layered illite/smectite minerals, such as ledikite and admixtures of illites with the layered materials named above. Other useful layered materials, particularly useful with anionic matrix polymers, may include the layered double hydroxide clays or hydrotalcites, such as $Mg_6Al_{3.4}(OH)_{18.8}(CO_3)_{1.7}H_2O$, which have positively charged layers and exchangeable anions in the interlayer spaces. Preferred layered materials are swellable so that other agents, usually organic ions or molecules, may splay, that is, intercalate and/or exfoliate, the layered material resulting in a desirable dispersion of the inorganic phase. These swellable layered materials include phyllosilicates of the 2:1 type, as defined in the literature (for example, "An introduction to clay colloid chemistry," by H. van Olphen, John Wiley & Sons Publishers). Typical phyllosilicates with ion exchange capacity of 50 to 300 milliequivalents per 100 grams are preferred. Generally, it is desirable to treat the selected clay material to separate the agglomerates of platelet particles to small crystals, also called tactoids, prior to introducing the platelet particles to the antiglare coating. Predispersing or separating the platelet particles also improves the binder/platelet interface. Any treatment that achieves the above goals may be used. Examples of useful treatments include intercalation with water soluble or water insoluble polymers, organic reagents or monomers, silane compounds, metals or organometallics, organic cations to effect cation exchange, and their combinations.

Additional particles for use in the antiglare layer of the present invention include polymer matte particles or beads which are well known in the art. The polymer particles may be solid or porous, preferably they are crosslinked polymer particles. Porous polymer particles for use in an antiglare layer are described in commonly-assigned U.S. patent application Ser. No. 10/715,706, filed Nov. 18, 2003.

Particles for use in the antiglare layer have an average particle size ranging from 2 to 20 micrometers, preferably from 2 to 15 micrometers and most preferably from 4 to 10 micrometers. They are present in the layer in an amount of at least 2 wt percent and less than 50 percent, typically from about 2 to 40 wt. percent, preferably from 2 to 20 percent and most preferably from 2 to 10 percent.

The thickness of the antiglare layer is generally about 0.5 to 50 micrometers preferably 1 to 20 micrometers more preferably 2 to 10 micrometers.

Preferably, the antiglare layer used in the present invention has a 60° Gloss value, according to ASTM D523, of less than 100, preferably less than 90 and a transmission haze value, according to ASTM D-1003 and JIS K-7105 methods, of less than 50%, preferably less than 30%.

In another embodiment of the present invention, a low reflection layer or antireflection layer is used in combination with an abrasion resistant hard coat layer or antiglare layer. The low reflection or antireflection layer is applied on top of the abrasion resistant or antiglare layer. Typically, a low reflection layer provides an average specular reflectance (as measured by a spectrophotometer and averaged over the wavelength range of 450 to 650 nm) of less than 2%. Antireflection layers provide average specular reflectance values of less than 1%.

Suitable low reflection layers for use in the present invention comprise fluorine-containing homopolymers or copolymers having a refractive index of less than 1.48, preferably with a refractive index between about 1.35 and 1.40. Suitable fluorine-containing homopolymers and copolymers include: fluoro-olefins (for example, fluoroethylene, vinylidene fluoride, tetrafluoroethylene, hexafluoroethylene, hexafluoropropylene, perfluoro-2,2-dimethyl-1,3-dioxol), partially or completely fluorinated alkyl ester derivatives of (meth)acrylic acid, and completely or partially fluorinated vinyl ethers, and the like. The effectiveness of the layer may be improved by the incorporation of submicron-sized inorganic particles or polymer particles that induce interstitial air voids within the coating. This technique is further described in U.S. Pat. No. 6,210,858 and U.S. Pat. No. 5,919,555. Further improvement of the effectiveness of the low reflection layer may be realized with the restriction of air voids to the internal particle space of submicron-sized polymer particles with reduced coating haze penalty, as described in commonly-assigned U.S. Patent Application 2005/0196552A, filed Apr. 7, 2005.

The thickness of the low reflection layer is 0.01 to 1 micrometer and preferably 0.05 to 0.2 micrometer.

An antireflection layer may comprise a monolayer or a multi-layer. Antireflection layers comprising a monolayer typically provide reflectance values less than 1% at only a single wavelength (within the broader range of 450 to 650 nm). A commonly employed monolayer antireflection coating that is suitable for use in the present invention comprises a layer of a metal fluoride such as magnesium fluoride ($MgF_2$). The layer may be applied by well-known vacuum deposition technique or by a sol-gel technique. Typically, such a layer has an optical thickness (i.e., the product of refractive index of the layer times layer thickness) of approximately one quarter-wavelength at the wavelength where a reflectance minimum is desired.

Although a monolayer can effectively reduce the reflection of light within a very narrow wavelength range, more often a multi-layer comprising several (typically, metal oxide based) transparent layers superimposed on one another is used to reduce reflection over a wide wavelength region (i.e., broadband reflection control). For such a structure, half wavelength layers are alternated with quarter wavelength layers to improve performance. The multi-layer antireflection coating may comprise two, three, four, or even more layers. Formation of this multi-layer typically requires a process comprising a number of vapor deposition procedures or sol-gel coatings, which correspond to the number of layers, each layer having a predetermined refractive index and thickness. Precise control of the thickness of each layer is required for these interference layers. The design of suitable multi-layer antireflection coatings for use in the present invention is well known in the patent art and technical literature, as well as being described in various textbooks, for example, in H. A. Macleod, "Thin Film Optical Filters," Adam Hilger, Ltd., Bristol 1985 and James D. Rancourt, "Optical Thin Films User's Handbook", Macmillan Publishing Company, 1987.

The polarizer plates of the invention may contain a moisture barrier as an optical film on one or both sides of the polarizing film. The moisture barrier layer comprises a hydrophobic polymer such as a vinylidene chloride polymer, vinylidene fluoride polymer, polyurethane, polyolefin, fluorinated polyolefin, polycarbonate, and others, having a low moisture permeability. Preferably, the hydrophobic polymer comprises vinylidene chloride. More preferably, the hydrophobic polymer comprises 70 to 99 weight percent of vinylidene chloride. The moisture barrier layer may be applied by application of an organic solvent-based or aqueous coating formulation. To provide effective moisture barrier properties the layer should be at least 1 micrometer in thickness, preferably from 1 to 10 micrometers in thickness, and most preferably from 2 to 8 micrometers in thickness. The optical film of the invention comprising a moisture barrier layer has a moisture vapor transmission rate (MVTR) according to ASTM F-1249 that is less than 1000 g/m² day, preferably less than 800 g/m²/day and most preferably less than 500 g/m²/day. The use of such a barrier layer in the optical film provides improved resistance to changes in humidity and increased durability of the polarizer plate.

The polarizer plates of the invention may contain a transparent antistatic layer as an optical film on either side of the polarizing film. The antistatic layer aids in the control of static charging that may occur during the handling and use of the polarizing plate. Effective control of static charging reduces the propensity for the attraction of dirt and dust to the polarizer plate and the display. Static related problems can be effectively controlled by an antistatic layer having a resistivity of less than about $1 \times 10^{11}$ Ω/square, preferably less than $1 \times 10^{10}$ Ω/square, and most preferably less than $1 \times 10^{9}$ Ω/square.

Various polymeric binders and conductive materials may be employed in the antistatic layer. Polymeric binders useful in the antistatic layer include any of the polymers commonly used in the coating art, for example, interpolymers of ethylenically unsaturated monomers, cellulose derivatives, polyurethanes, polyesters, hydrophilic colloids such as gelatin, polyvinyl alcohol, polyvinyl pyrrolidone, and others.

Conductive materials employed in the antistatic layer may be either ionically-conductive or electronically-conductive.

Ionically-conductive materials include simple inorganic salts, alkali metal salts of surfactants, polymeric electrolytes containing alkali metal salts, and colloidal metal oxide sols (stabilized by metal salts). Of these, ionically-conductive polymers such as anionic alkali metal salts of styrene sulfonic acid copolymers and cationic quaternary ammonium polymers of U.S. Pat. No. 4,070,189 and ionically-conductive colloidal metal oxide sols which include silica, tin oxide, titania, antimony oxide, zirconium oxide, alumina-coated silica, alumina, boehmite, and smectite clays are preferred.

The antistatic layer employed in the current invention preferably contains an electronically-conductive material due to their humidity and temperature independent conductivity. Suitable materials include:

1) electronically-conductive metal-containing particles including donor-doped metal oxides, metal oxides containing oxygen deficiencies, and conductive nitrides, carbides, and bromides. Specific examples of particularly useful particles include conductive $SnO_2$, $In_2O$, $ZnSb_2O_6$, $InSbO_4$, $TiB_2$, $ZrB_2$, $NbB_2$, $TaB_2$, $CrB$, $MoB$, $WB$, $LaB_6$, $ZrN$, $TiN$, $WC$, $HfC$, $HfN$, and $ZrC$. Examples of the patents describing these electrically conductive particles include; U.S. Pat. Nos. 4,275,103; 4,394,441; 4,416,963; 4,418,141; 4,431,764; 4,495,276; 4,571,361; 4,999,276; 5,122,445; and 5,368, 995.

2) fibrous electronic conductive particles comprising, for example, antimony-doped tin oxide coated onto non-conductive potassium titanate whiskers as described in U.S. Pat. Nos. 4,845,369 and 5,166,666, antimony-doped tin oxide fibers or whiskers as described in U.S. Pat. Nos. 5,719,016 and 5,0731, 119, and the silver-doped vanadium pentoxide fibers described in U.S. Pat. No. 4,203,769

3) electronically-conductive polyacetylenes, polythiophenes, and polypyrroles, preferably the polyethylene dioxythiophene described in U.S. Pat. No. 5,370,981 and commercially available from Bayer Corp. as Baytron® P.

The amount of the conductive agent used in the antistatic layer of the invention can vary widely depending on the conductive agent employed. For example, useful amounts range from about 0.5 mg/m² to about 1000 mg/m², preferably from about 1 mg/m² to about 500 mg/m². The antistatic layer has a thickness of from 0.05 to 5 micrometers, preferably from 0.1 to 0.5 micrometers to insure high transparency.

Contrast, color reproduction, and stable gray scale intensities are important quality attributes for electronic displays, which employ liquid crystal technology. The primary factor limiting the contrast of a liquid crystal display is the propensity for light to "leak" through liquid crystal elements or cells, which are in the dark or "black" pixel state. Furthermore, the leakage and hence contrast of a liquid crystal display are also dependent on the direction from which the display screen is viewed. Typically the optimum contrast is observed only within a narrow viewing angle range centered about the normal incidence to the display and falls off rapidly as the viewing direction deviates from the display normal. In color displays, the leakage problem not only degrades the contrast but also causes color or hue shifts with an associated degradation of color reproduction.

Thus, one of the major factors measuring the quality of LCDs is the viewing angle characteristic, which describes a change in contrast ratio from different viewing angles. It is desirable to be able to see the same image from a wide variation in viewing angles and this ability has been a shortcoming with liquid crystal display devices. One way to improve the viewing angle characteristic is to employ a polarizer plate having a viewing angle compensation layer (also referred to as a compensation layer, retarder layer, or phase difference layer), with proper optical properties, between the polarizing film and the liquid crystal cell, such as disclosed in U.S. Pat. Nos. 5,583,679, 5,853,801, 5,619,352, 5,978,055, and 6,160,597. A compensation film according to U.S. Pat. Nos. 5,583,679 and 5,853,801 based on discotic liquid crystals which have negative birefringence, is widely used.

Viewing angle compensation films useful in the present invention are optically anisotropic layers. The optically anisotropic, viewing angle compensation layers may comprise positively birefringent materials or negatively birefringent materials. The compensation layer may be optically uniaxial or optically biaxial. The compensation layer may have its optic axis tilted in the plane perpendicular to the layer. The tilt of the optic axis may be constant in the layer thickness direction or the tilt of the optic axis may vary in the layer thickness direction.

Optically anisotropic, viewing angle compensation films useful in the present invention may comprise the negatively or positively birefringent, discotic liquid crystals described in U.S. Pat. Nos. 5,583,679, and 5,853,801; the positively birefringent nematic liquid crystals described in U.S. Pat. No. 6,160,597; the negatively birefringent amorphous polymers described in commonly assigned U.S. Patent Application Publication 2004/0021814A, U.S. patent application Ser. No. 10/745,109, filed Dec. 23, 2003 and U.S. patent application Ser. Nos. 11/159,683 and 165,090 filed Jun. 23, 2005. These latter two patent applications describe compensation layers comprising polymers that contain non-visible chromophore groups such as vinyl, carbonyl, amide, imide, ester, carbonate, sulfone, azo, and aromatic groups (i.e. benzene, naphthalate, biphenyl, bisphenol A) in the polymer backbone and that preferably have a glass transition temperature of greater than 180 degree C. Such polymers are particularly useful in the compensation layer of the present invention. Such polymers include polyesters, polycarbonates, polyimides, polyetherimides, and polythiophenes. Of these, particularly preferred polymers for use in the present invention include: (1) a poly (4,4'-hexafluoroisopropylidene-bisphenol) terephthalate-co-isophthalate, (2) a poly(4,4'-hexahydro-4,7-methanoindan-5-ylidene bisphenol) terephthalate, (3) a poly(4,4'-isopropylidene-2,2'6,6'-tetrachlorobisphenol) terephthalate-co-isophthalate, (4) a poly(4,4'-hexafluoroisopropylidene)-bisphenol-co-(2-norbornylidene)-bisphenol terephthalate, (5) a poly(4,4'-hexahydro-4,7-methanoindan-5-ylidene)-bisphenol-co-(4,4'-isopropylidene-2,2',6,6'-tetrabromo)-bisphenol terephthalate, (6) a poly(4,4'-isopropylidene-bisphenol-co-4,4'-(2-norbornylidene)bisphenol) terephthalate-co-isophthalate, (7) a poly(4,4'-hexafluoroisopropylidene-bisphenol-co-4,4'-(2-norbornylidene) bisphenol) terephthalate-co-isophthalate, or (8) copolymers of any two or more of the foregoing. A compensation layer comprising these polymers typically has an out-of-plane retardation, $R_{th}$, that is more negative than $-20$ nm, preferably $R_{th}$ is from $-60$ to $-600$ nm, and most preferably $R_{th}$ is from $-150$ to $-500$ nm. Positively birefringent polymers include polyvinylcarbazole and copolymers thereof. A compensation layer comprising these polymers typically has an out-of-plane retardation, $R_{th}$ that is more positive than $+1$ nm, preferably in the range of $+50$ to $+150$ nm.

Another compensation film suitable for the present invention includes an optically anisotropic layer comprising an exfoliated inorganic clay material in a polymeric binder as described in Japanese Patent Application 11095208A.

In accordance with the present invention, a tie layer (which is itself considered to be an optical layer) may be advantageously employed as the lowermost layer (layer closest to the polarizing film) of a multi-layer optical film stack to insure good adhesion between the hydrophilic polarizing film and the other optical film layers that are typically hydrophobic in nature. In another embodiment of the invention, a tie layer is employed between two other optical film layers to bind these two optical film layers together. A tie layer may be applied in a separate coating application or it may be applied simultaneously with one or more other optical film layers. Preferably, for best adhesion, a tie layer is applied with at least one adjacent optical film layer.

The tie layer composition is selected such that it has an affinity for the underlying and overlying layers or films. The tie layer may be applied from aqueous or organic solvent coating solution. Preferably, the tie layer is applied from organic solvent solution.

In one embodiment wherein the tie layer provides adhesion between a PVA-containing polarizing film and another optical film layer the tie layer is preferably comprises a synthetic or natural polymer having at least one hydrophilic moiety, which include hydroxyl, carboxyl, amino, or sulfonyl moieties. Materials useful for forming a tie layer that promotes adhesion to PVA polarizing films include proteins, protein derivatives, cellulose derivatives (e.g. cellulose esters), polysaccharides, casein, and the like, poly(vinyl lactams), acrylamide polymers, polyvinyl alcohol and its derivatives, hydrolyzed polyvinyl acetates, polymers of alkyl and sulfoalkyl acrylates and methacrylates, polyamides, polyvinyl pyridine, acrylic acid polymers, maleic anhydride copolymers, polyalkylene oxide, methacrylamide copolymers, polyvinyl oxazolidinones, maleic acid copolymers, vinyl amine copolymers, methacrylic acid copolymers, itaconic acid copolymers, acryloyloxyalkyl sulfonic acid copolymers, vinyl imidazole copolymers, vinyl sulfide copolymers, homopolymer or copolymers containing styrene sulfonic acid, and the like. Other suitable polymer are polyurethanes polyesters, and polyurethane/vinyl hybrid polymers.

The tie layer may also contain a crosslinking agent. Crosslinking agents useful for the practice of the invention include any compounds that are capable of reacting with moieties attached to the polymer binder in the tie layer and the underlying and/or overlying layers. Such crosslinking agents include aldehydes and related compounds, pyridiniums, olefins such as bis(vinylsulfonyl methyl)ether, carbodiimides, epoxides, triazines, polyfunctional aziridines, methoxyalkyl melamines, polyisocyanates, and the like. Additional crosslinking agents that may also be successfully employed in the tie layer include multivalent metal ion such as zinc, calcium, zirconium and titanium.

The tie layer is typically applied at a dried coating thickness of 0.1 to 5 micrometers, preferably 0.25 to 1 micrometers.

Organic solvents suitable for solubilizing and coating the tie layer polymer include chlorinated solvents (methylene chloride and 1,2 dichloroethane), alcohols (methanol, ethanol, n-propanol, isopropanol, n-butanol, isobutanol, diacetone alcohol and cyclohexanol), ketones (acetone, methylethyl ketone, methylisobutyl ketone, and cyclohexanone), esters (methyl acetate, ethyl acetate, n-propyl acetate, isopropyl acetate, isobutyl acetate, n-butyl acetate, and methylacetoacetate), aromatics (toluene and xylenes) and ethers (1,3-dioxolane, 1,2-dioxolane, 1,3-dioxane, 1,4-dioxane, and 1,5-dioxane). Preferably the tie-layer polymer described above is essentially soluble in at least one, preferably most of the above 28 named solvents, more preferably soluble in at least one of the solvents in most of the six mentioned groups (chlorinated, alcohols, etc.). In some applications, small amounts of water may be used. Normally, the coating solutions are prepared with a blend of the aforementioned solvents. Preferred primary solvents include methylene chloride, acetone, methyl acetate, and 1,3-dioxolane. Preferably, the tie-layer polymer is substantially soluble in these solvents. Preferred co-solvents for use with the primary solvents include methanol, ethanol, n-butanol and water. Preferably, the tie layer polymer is applied from the same or at least compatible solvent mixture as the overlying optical film layer, especially if the tie layer and the overlying optical film layer are applied using a multi-layer slide coating method. In general, solubility refers to greater than 1.0 weight percent, preferably at least 2.0 percent, at 20° C.

The polarizer plates of the invention are suitable for use with a wide variety of LCD display modes, for example, Twisted Nematic (TN), Super Twisted Nematic (STN), Optically Compensated Bend (OCB), In Plane Switching (IPS), or Vertically Aligned (VA) liquid crystal displays. These various liquid crystal display technologies have been reviewed in U.S. Pat. Nos. 5,619,352 (Koch et al.), 5,410,422 (Bos), and 4,701,028 (Clerc et al.).

As should be obvious based on the preceding detailed description, a wide variety of polarizer plates having various types and arrangements of optical film layers may be prepared by the methods of the invention. The invention has been described in detail with particular reference to certain preferred embodiments thereof, but it will be understood that variations and modifications can be effected within the spirit and scope of the invention.

PARTS LIST 5 tandem coating and drying system
8 simultaneous coating and drying system
10 coating and drying apparatus
12 moving polarizing film
14 dryer
14a dryer
14b dryer
15 film conveyance element
16 coating apparatus
16a coating apparatus
16b coating apparatus
16c coating apparatus
16d coating apparatus
18 unwinding station
20 back-up roller
20a back-up roller
20b back-up roller
22 coated film
22a coated film
22b coated film
24 polarizer plate
26 winding station
28 coating supply vessel
28a coating supply vessel
28b coating supply vessel
28c coating supply vessel
28d coating supply vessel
30 coating supply vessel
30a coating supply vessel
30b coating supply vessel
32 coating supply vessel
32a coating supply vessel
32b coating supply vessel
34 coating supply vessel
34a coating supply vessel 34b coating supply vessel
36 pumps
36a pumps
36b pumps
36c pumps
36d pumps
38 pumps
38a pumps
38b pumps
40 pumps
40a pumps
40b pumps
42 pumps
42a pumps
42b pumps
44 conduits
44a conduits
44b conduits
46 conduits
46a conduits
46b conduits
48 conduits
48a conduits
48b conduits
50 conduits
50a conduits
50b conduits
52 discharge device
52a discharge device
52b discharge device
54 polar charge assist device
54a polar charge assist device
54b polar charge assist device
66 drying section
68 drying section
70 drying section
72 drying section
74 drying section
76 drying section
78 drying section
80 drying section
82 drying section
92 front section
94 second section
96 third section
98 fourth section
100 back plate
102 inlet
104 metering slot
106 pump
108 lower most layer
110 inlet
112 $2^{nd}$ metering slot
114 pump
116 layer
118 inlet
120 metering slot
122 pump
124 form layer
126 inlet
128 metering slot
130 pump
132 layer
134 incline slide surface
136 coating lip
138 $2^{nd}$ incline slide surface
140 $3^{rd}$ incline slide surface
142 $4^{th}$ incline slide surface
144 back land surface
146 coating bead
151 polarizer plate
153 polarizer plate
155 polarizer plate
161 lowermost layer
161a lowermost layer
161b lowermost layer
162 lowermost layer
162a lowermost layer
162b lowermost layer
163 intermediate layer
164 intermediate layer
165 outermost layer
165a outermost layer
165b outermost layer
166 outermost layer
166a outermost layer
166b outermost layer
170 polarizing film
171 optical film stack
173 optical film stack
175 optical film stack
177 optical film stack
179 optical film stack
181 optical film stack
252 polarizer plate
254 polarizer plate
260 LCD cell
261 tie layer
262 low birefringence polymer film
264 barrier layer
266 antistatic layer
268 antiglare layer
272 viewing angle compensation layer

The invention claimed is:

1. A method of making a polarizing plate comprising
   a. passing a polarizing film between a first coating apparatus and a second coating apparatus, the first coating apparatus and the second coating apparatus being opposingly located adjacent to corresponding first and second sides of the polarizing film,
   b. combining a plurality of coating liquids in at least one of the first and second coating apparatus;
   c. simultaneously coating the plurality of coating liquids as a layered optical film solution from at least one of the first and second coating apparatus directly onto the corresponding side of the polarizing film,
   d. concurrently coating an opposing side of the polarizing film with one of the layered optical film solution and a second optical film solution, whereby the optical film solutions from the first coating apparatus and the second coating apparatus are directly deposited onto opposing regions of the corresponding first and second sides of the polarizing film; and,
   e. drying or curing the optical film coating solution on each side of the polarizing film to form an optical film or optical film stack.

2. The method of claim 1 wherein the coating solution is applied utilizing a non-contact method.

3. The method of claim 1 wherein the thickness of the optical film is less than 40 micrometers.

4. The method of claim 1 wherein the thickness of the optical film is less than 20 micrometers.

5. The method of claim 1 wherein the thickness of the polarizer plate is less than 110 micrometers.

6. The method of claim 1 wherein the optical film is a low birefringence polymer film, barrier layer, hard coat layer, antistatic layer, tie layer, antiglare layer, antireflection layer, low reflection layer, or compensation layer.

7. The method of claim 1 wherein more than one optical film is coated on each side of the polarizing film.

8. The method of claim 1 wherein the polarizer film is in a vertical position when the optical film coatings are applied.

9. The method of claim 1 wherein more than one optical film is coated on one side of the polarizing film and one optical film is coated on the other side of the polarizing film.

10. The method of claim 7 wherein the number of optical films coated on each side of the polarizing film is different.

11. The method of claim 7 wherein the composition or type of the optical films coated on each side of the polarizer film is different.

12. The method of claim 1 wherein the composition or type of the optical film coated on each side of the polarizing film is different.

13. The method of claim 1 wherein a tie layer is coated on the polarizing film prior to coating the other optical film layers.

14. The method of claim 1 wherein the optical film formed is a low birefringence polymer film having an in-plane birefringence $\Delta n_{in}$ of less than about $1 \times 10^{-4}$ and an out-of-plane birefringence $\Delta n_{th}$ of from 0.005 to −0.005.

15. The method of claim 1 wherein the low birefringence polymer film comprises TAG, polycarbonate or a cyclic polyolefin copolymer.

16. The method of claim 1 wherein the polarizing film is provided through a continuous sequential process with the formation of the polarizing film.

17. The method of claim 1 wherein the coatings are applied using a bead coating method, a single slot extrusion coating method, a multi-layer slide bead coating method or a multi-slot extrusion coating method.

18. The method of claim 1 wherein a second optical film is coated on one or both sides of the polarizing film after the at least one optical film is dry.

19. The method of claim 1 wherein the optical film is a compensation film comprising (1) a poly(4,4'-hexafluoroisopropylidene-bisphenol)terephthalate-co-isophthalate, (2) a poly(4,4'-hexahydro-4,7-methanoindan-5-ylidene bisphenol) terephthalate, (3) a poly(4,4'-isopropylidene-2,2'6,6'-tetrachlorobisphenol) terephthalate-co-isophthalate, (4) a poly(4,41-hexafluoroisopropylidene)-bisphenol-co-(2-norbornylidene)-bisphenol terephthalate, (5) a poly(4,4'-hexahydro-4,7-methanoindan-5-ylidene)-bisphenol-co-(4,4'-isopropylidene-2,2',6,6'-tetrabromo)-bisphenol terephthalate, (6) a poly(4,4'-isopropylidene-bisphenol-co-4,4'-(2-norbornylidene)bisphenol)terephthalate-co-isophthalate, (7) a poly(4,4'-hexafluoroisopropylidene-bisphenol-co-4,4'-(2-norbornylidene)bisphenol)terephthalate-co-isophthalate, or (8) copolymers of any two or more of the foregoing, or (9) polyvinylcarbazole or copolymers thereof.

20. The method of claim 1 wherein the polarizing film comprises poly vinyl alcohol.

21. The method of claim 1 wherein the polarizing film is an H-type polarizer.

22. The method of claim 7 wherein the optical film stack includes a tie layer that is coated closest to the polarizing film.

\* \* \* \* \*

UNITED STATES PATENT AND TRADEMARK OFFICE
CERTIFICATE OF CORRECTION

PATENT NO. : 7,732,007 B2  Page 1 of 1
APPLICATION NO. : 11/305928
DATED : June 8, 2010
INVENTOR(S) : Brent C. Bell It is certified that error appears in the above-identified patent and that said Letters Patent is hereby corrected as shown below:

| Issued Patent | | Description of Error |
|---|---|---|
| Column | Line | |
| 27 | 28 | In Claim 15, delete "TAG" and insert -- TAC -- |
| 28 | 14 | In Claim 19, delete "(4,41" and insert -- (4,4' -- |

Signed and Sealed this

Twelfth Day of October, 2010

David J. Kappos
*Director of the United States Patent and Trademark Office*